(12) United States Patent
Howell et al.

(10) Patent No.: US 6,215,992 B1
(45) Date of Patent: Apr. 10, 2001

(54) UNIVERSAL DICTATION INPUT APPARATUS AND METHOD

(76) Inventors: Dennis S. Howell, 14385 S. Blackfeather Dr., Olathe, KS (US) 66062; Donald E. Latson, 78 Marlin Dr., New Haven, CT (US) 06515; Jason D. Gaines, 6421 Chouteau, Shawnee, KS (US) 66226; Richard Ford, 12601 Locust, Olathe, KS (US) 66062; Franklin B. Parks, 7212 Hadley, Overland Park, KS (US) 66204; Robert W. Ross, 10724 W. 57th Terr., Shawnee, KS (US) 66203; John R. Nelson, 2319 W. 85th Terr., Leawood, KS (US) 66206

( * ) Notice: Subject to any disclaimer, the term of this patent is extended or adjusted under 35 U.S.C. 154(b) by 0 days.

(21) Appl. No.: 08/902,589

(22) Filed: Jul. 29, 1997

(51) Int. Cl.$^7$ ........................................ H04B 1/06
(52) U.S. Cl. ........................ 455/412; 455/403; 379/67
(58) Field of Search ..................... 455/411, 412, 455/414, 413, 550, 525, 563, 463, 464, 465, 403, 461; 360/60, 93, 137, 72.2; 379/67

(56) References Cited

U.S. PATENT DOCUMENTS

| | | | |
|---|---|---|---|
| 4,039,760 | 8/1977 | Gregory et al. | 179/41 A |
| 4,456,793 | 6/1984 | Baker et al. | 179/99 R |
| 4,597,104 | * 6/1986 | Ohki et al. | 455/32 |
| 4,672,657 | * 6/1987 | Dershowitz | 379/63 |
| 4,768,220 | * 8/1988 | Yoshihara et al. | 379/63 |
| 4,843,498 | * 6/1989 | Trutzschler | 360/93 |
| 4,850,009 | 7/1989 | Zook et al. | 379/96 |

(List continued on next page.)

OTHER PUBLICATIONS

"Voice Recognition Eases Auto Auctions", *Automatic I.D. News*, vol. 10, No. 8, John Jesitus, ed., Advanstar Pub., U.S.A., Jul. 1994.

*Primary Examiner*—Daniel S. Hunter
*Assistant Examiner*—Pablo N. Tran
(74) *Attorney, Agent, or Firm*—Hovey, Williams, Timmons & Collins

(57) ABSTRACT

The universal dictation input apparatus and method disclosed employs multiple wireless dictation devices ("WDD") and base stations each of which include a 900 MHz radio for communicating with one another over selected radio frequency ("RF") channel pairs to conduct dictation sessions on centralized dictation systems ("CDSs"). Each base station is uniquely assigned a single channel pair. The WDDs are programmed with code representing the exclusive channels of a select number of base stations. When a user takes a WDD off-hook, a WDD sequentially and cyclically scans for carrier transmitted by authorized base stations until an idle base station is identified and linked to over the authorized channel. The user of a WDD must be authorized to conduct dictation sessions on one or more CDSs. To this end the WDDs includes a dialing address keypad to address authorized CDSs. The CDSs are third party systems addressed from a WDD by DTMF dialing digits. Dictation sessions are conducted by sending dictation commands, for example "record" and "play" in the form of DTMF digits to the CDSs. The WDDs send data as ASCII codes in packets to a base station. The transmitted data includes dialing digits and system commands for the base station. The WDDs generate data from the dialing keypad, programmable keys customized to send frequently used dictation commands to a CDS and to provide other specialized features and a barcode reader. Specific setup data is downloaded to a base station to enable it to execute commands and dialing, digits unique to CDS of different vendors and to prepare for receipt of verbal dictation commands. A base station includes a voice recognition algorithm to translate verbal commands spoken at a WDD, such as "record" and "play," into codes forwarded to a CDS as DTMF digits.

8 Claims, 8 Drawing Sheets

U.S. PATENT DOCUMENTS

| | | | |
|---|---|---|---|
| 4,857,716 | 8/1989 | Gombrich et al. | 235/462 |
| 4,894,856 * | 1/1990 | Nakanishi et al. | 379/61 |
| 4,916,441 | 4/1990 | Gombrich | 340/712 |
| 5,126,543 | 6/1992 | Bergeron et al. | 235/462 |
| 5,307,372 | 4/1994 | Sawyer et al. | 375/1 |
| 5,428,666 * | 6/1995 | Fyfe et al. | 379/58 |
| 5,442,680 * | 8/1995 | Schellinger et al. | 379/58 |
| 5,463,674 * | 10/1995 | Gillig et al. | 379/59 |
| 5,774,805 * | 6/1998 | Zicker | 455/426 |
| 5,790,957 * | 8/1998 | Heidari | 455/553 |
| 5,835,588 * | 11/1998 | Zell | 380/4 |
| 5,845,240 * | 12/1998 | Fielder | 704/201 |
| 5,867,793 * | 2/1999 | Davis | 455/556 |
| 5,898,916 * | 4/1999 | Breslawsky | 455/412 |
| 5,901,357 * | 5/1999 | D'Avello et al. | 455/454 |

* cited by examiner

UNIVERSAL DICTATION INPUT APPARATUS AND METHOD

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

MICROFICHE APPENDIX

This specification includes a microfiche appendix which consists of 3 sheets of microfiche containing 285 frames.

FIELD OF THE INVENTION

This invention relates generally to centralized dictation systems ("CDS" or "CDSs") for conducting dictation sessions a user from a telephone handset, and more particularly, though in its broader aspects not limited to, methods and apparatus for conducting dictation sessions on CDSs of different manufacturers employing a novel and improved 900 MHz wireless dictation device ("WDD") and a novel 900 MHz base station which define a universal dictation input system.

BACKGROUND OF THE INVENTION

Certain work environments lend themselves to a shared or centralized dictation system ("CDS"), implemented on one or more computers, for helping a group of workers maintain records about the group's services, projects, products, customers and suppliers. The health care industry is an example of such work environments. Multiple doctors and other health care providers serve the same patient with each of the several providers frequently requiring access to a patient's records during hospital stays, for example, including the most recently added information. A CDS helps solve those and related record keeping problems, including keeping track of billing information.

CDSs available from many different vendors are employed in hospitals, health maintenance organizations ("HMOs") and clinics, for example. Doctors and other health care workers use telephones to dial a CDS and record dictated information about a patient and, at least with some CDSs, to enter alpha numeric data pertaining to a patient into a data field associated with the dication session. The data is entered into the CDS through a dialing keypad of a telephone.

CDSs are accessed by telephone over a standard telephone line by dialing an address of a CDS into a hospital's private branch exchange ("PBX") switch or, in some cases, into a public telephone company ("TELCO") switch. The TELCO switch is required when the shared CDS is located remotely from the facility housing the health care workers. Cordless phones and cellular phones have been used with CDS systems. In health care environments, or campuses, the noise levels associated with cordless phones results in poor voice recordings on the CDS. In the case of cellular phones, their performance in heath care campuses, in particular, are frequently not satisfactory because these phones interfere with diagnostic and patient life support equipment.

Typically, a doctor sets up and conducts a dictation session with a CDS from a dictation station or a standard telephone located at a nurse's station, doctor's lounge or the like, often deliberately away from the patient. The doctor dials at the keypad the switch address for the CDS and, when a connection is established to the CDS, enters a user identification number, a patient identification number and other administrative and billing information using the 0–9, * and # keys of a standard dialing keypad or the 0–9, *, #, A, B, C and D keys of an extended, standard dialing keypad. The extended keypad is preferred for use with CDSs which employ the A–D within their command set. The CDS issues voice prompts to the doctor requesting the foregoing information. Thereafter, a dictation session is started with dictation control commands generated by pressing the keys on the standard keys of a dialing keypad. For example, a dictation session is started by the doctor pressing the # key and stopped by releasing the # key. Other dictation commands including "rewind", "fast forward", "pause" and "play" are invoked by pressing other keys on the keypad. The DTMF tone signal associated with a key press is interpreted by the CDS as a dictation command and is context dependent. The assignment of particular keys among a dialing keypad to particular dictation commands is, for the most part, unique to the vendor of the CDS. Me l s of each CDS command and its associated dialing key, for a given CDS, is referred to as the CDS's command set or list.

SUMMARY

In view of the foregoing, one object of the present invention is to create universal dictation apparatus and method which overcome limitations of conducting dictation sessions with a CDS using a standard telephone, whether a standard line or cordless type.

It is also an object of the present invention to improve the ease of use and increase the breadth of features for a worker, such as a health care provider, faced with frequently setting up and conducting voice recording sessions on a CDS accessed over a dialed line, wherein the CDS is one among multiple models available from a number of different manufacturers.

Another object of this invention is to design a WDD which is customizable to the particular needs of individual workers among a group of workers sharing access to one or more CDSs, of different manufacture, through one or more base stations.

Yet another object of the invention is to incorporate into a base station of a dictation input system a voice recognition feature for translating individual spoken CDS dictation commands into DTMF tone signals to which the CDS correctly responds. Even a further object hereof is to combine a text to speech capability with the voice recognition feature to provide audio feedback from a base station to the user of a WDD of spoken words, in particular words for the decimal digits 0–9. This feature improves the accuracy of data entered through a WDD by voice.

Further, it is an object hereof to assign just one unique fill duplex RF channel among a fixed number of such channels to a base station for communicating with several WDDs over the unique channel, one at a time, and to assign to each WDD multiple unique RF channels associated with a like number of base stations, thereby authorizing a WDD to conduct dictation sessions with a CDS through one or more authorized base stations, one at a time.

The novel and improved universal dictation input system, apparatus and method of this invention, in the disclosed embodiments, comprises a WDD having a 900 MHz RF radio and a programmed processor and memory for storing dialing addresses of multiple CDS and the unique channels assigned to multiple base stations Furthermore, the base stations of the system also include a 900 MHz radio and a programmed processor for communicating with WDDs, one at a time, over a single authorized RF channel and for making connections to various CDSs.

The WDD includes a standard DTMF dialing keypad which includes the DTMF digits 0–9, * and # and four programmable keys, among ten such keys, which add the four DTMF digits A, B, C and D of a standard, extended DTMF keypad. All of the keys of the keypad and certain keys among the programmable keys are represented in the WDD by a one byte ASCII character code. Some of the programmable keys are represented by a string of ASCII character codes representing, for example, the dialing address of a CDS. A bar code reader mounted in the WDD is active when the power to the WDD is on. Moving the bar code reader over a bar code pattern attached, for example, to a hospital patients identification bracelet, gives rise to a string of ASCII code characters representing the 0–9 digits of a particular bar code convention The bar code reader serves as a CDS dialing signal generator by scanning a bar code containing the dialing digits for a CDS and by transmitting the dialing data to a base station.

All of the forgoing ASCII characters, or data, originating at the WDD are transmitted from the WDD to a base station in a packet or message form. Each packet includes a portion identifying the length of the packet in bytes and a portion identifying the origin of the data, that is, the data type. The base station acts on a received packet in accordance with its data type. Certain of the data to which a base station needs to process transmitted packets, for example, the command set of dictation commands for the particular CDS temporarily linked to the base station used to translate into ASCII codes a doctor's spoken words for the CDS commands and the words for the decimal digits 0–9, for data entry at the CDS, are downloaded to the base station from the WDD shortly after the power to the WDD is switched "on." Consequently, each base station is temporarily customized or programmed by a WDD to enable a doctor to control a dictation session with a CDS by speaking the word or words for the commands rather than searching for and pressing the keys on the WDD.

In the embodiment under discussion, 240 RF channels are available for a WDD and a base station to communicate with each other. Eight channels are reserved for testing the WDDs and base stations. A base station is assigned, exclusively, one channel with which to communicate with one or many WDDs. A WDD, on the other hand, is authorized to communicate, for example, with up to 232 base stations and several CDSs, the Emits of which are determined based on the needs of the users, for example, doctors, and the storage capacity of the WDD's non-volatile memory.

A WDD initiates a connection with a base station by scanning all the authorized channels assigned to the WDD to find the first one which is available, that is, not presently communicating with another WDD over the current channel being tested for activity. The scanning begins by tuning the WDD's radio frequency ("RF") receiver to a first authorized channel to detect the absence of any broadcast activity on the first channel, which means that the base station exclusively assigned this channel is idle and, therefore, available to the scanning WDD. The scanning continues, sequentially and cyclically, through all the channels until an idle base station is detected. At this point, the WDD transmits a packet to the base station containing the WDD's unique identification ("ID") number. The base station immediately repackages the ID number into a new packet and sends it back to the WDD.

The WDD verifies that it received its own ID back from the base station and downloads to the base station information needed to setup and conduct a dictation session with a particular CDS. The base station uploads information to a WDD including unique features and configuration characteristics not found in all base stations, for example voice recognition feature.

THE DRAWINGS

Other objects, features and advantages of the present invention are even more apparent from a further reading of the specification in conjunction with the drawings which are:

FIG. 1 is a schematic diagram of three universal dictation input systems, each including a user, a wireless dictation device ("WDD") and a base station coupled to a centralized dictation system ("CDS"). The base station in the top system is coupled to a CDS through a public telephone exchange ("TELCO") switch or switches. The base station in the middle system is coupled to a CDS through a private branch exchange ("PBX"). The base station in the bottom system is coupled directly to a CDS.

Figure 7A:
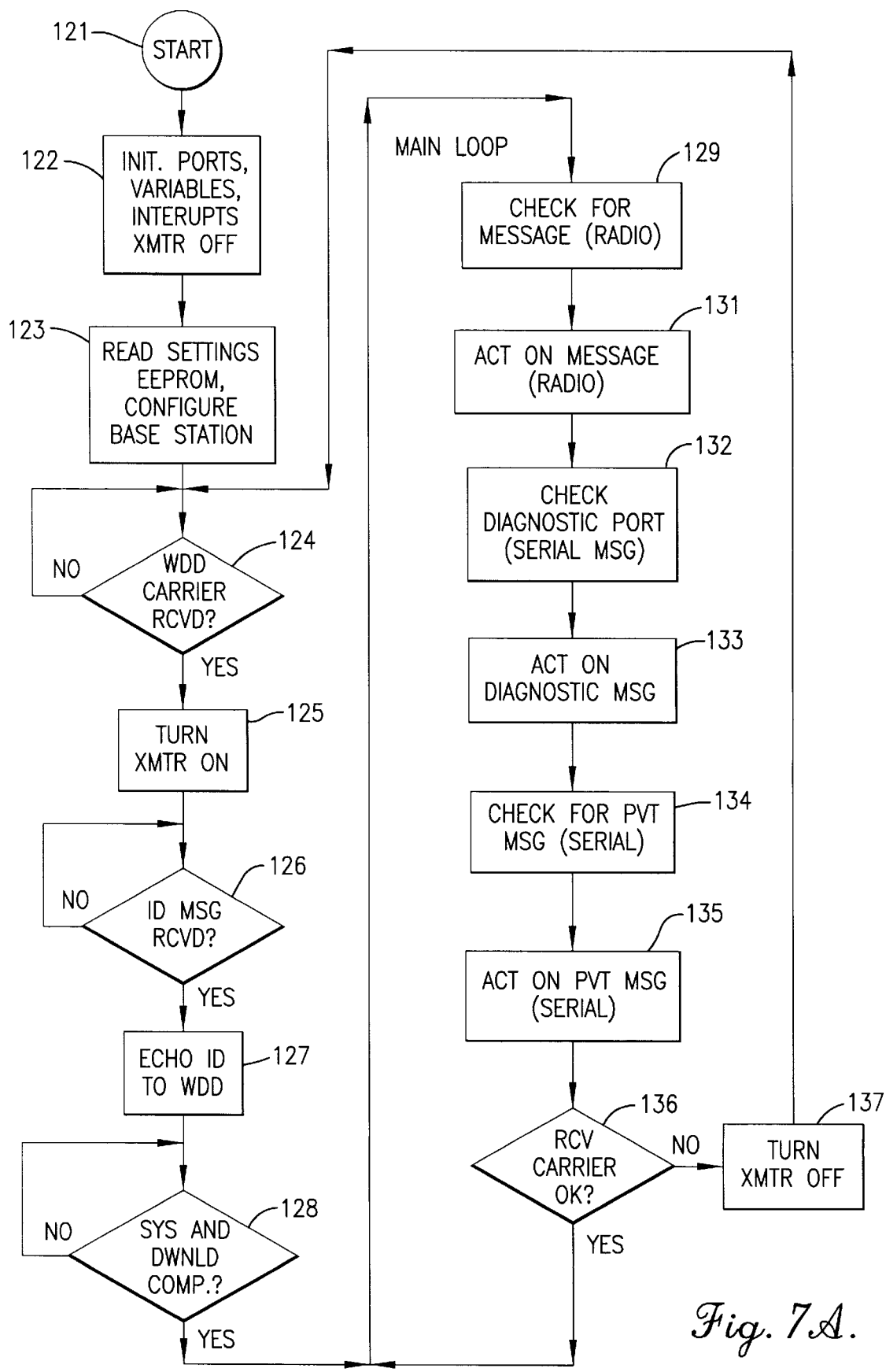
Figure 7B:
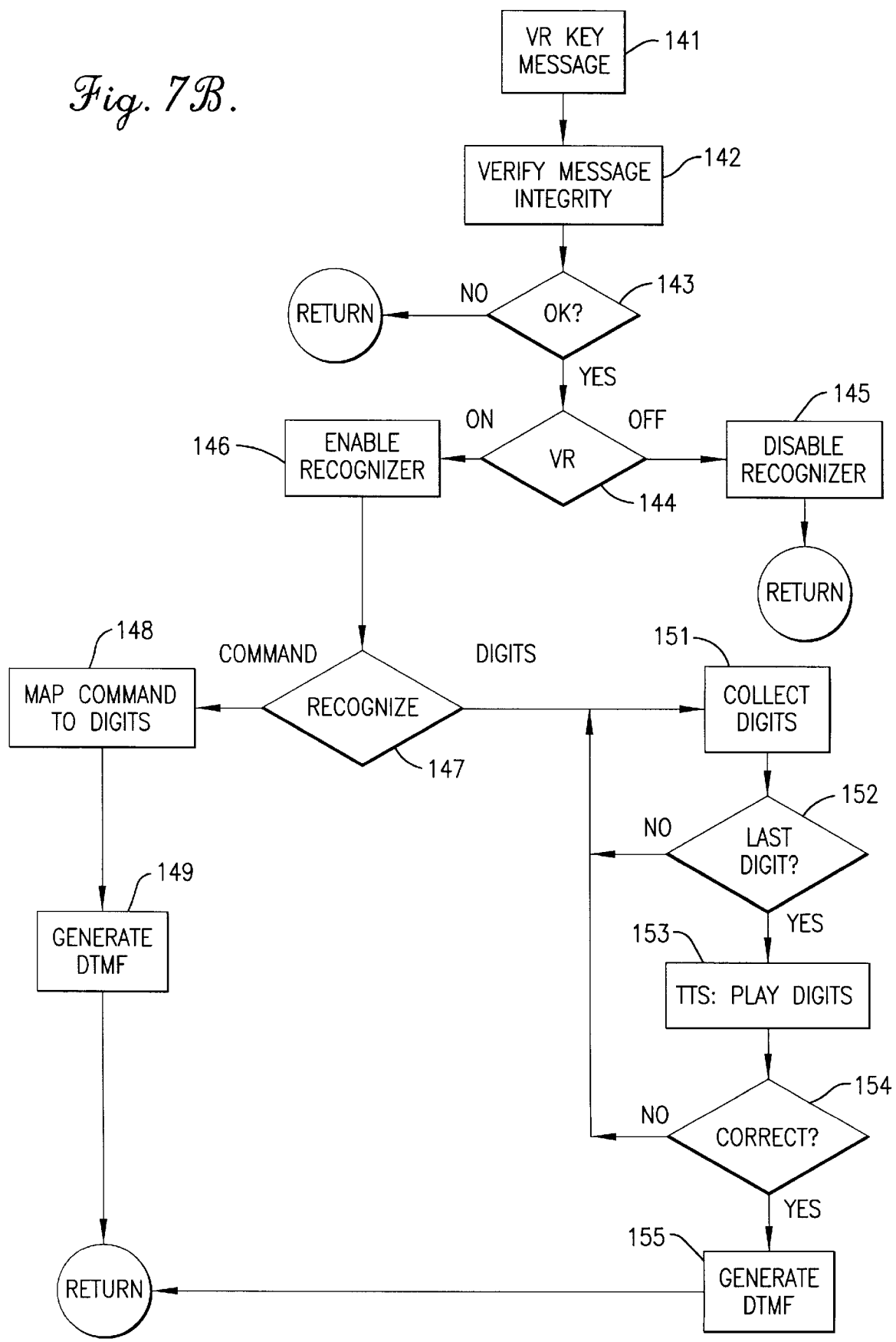
Figure 7C:
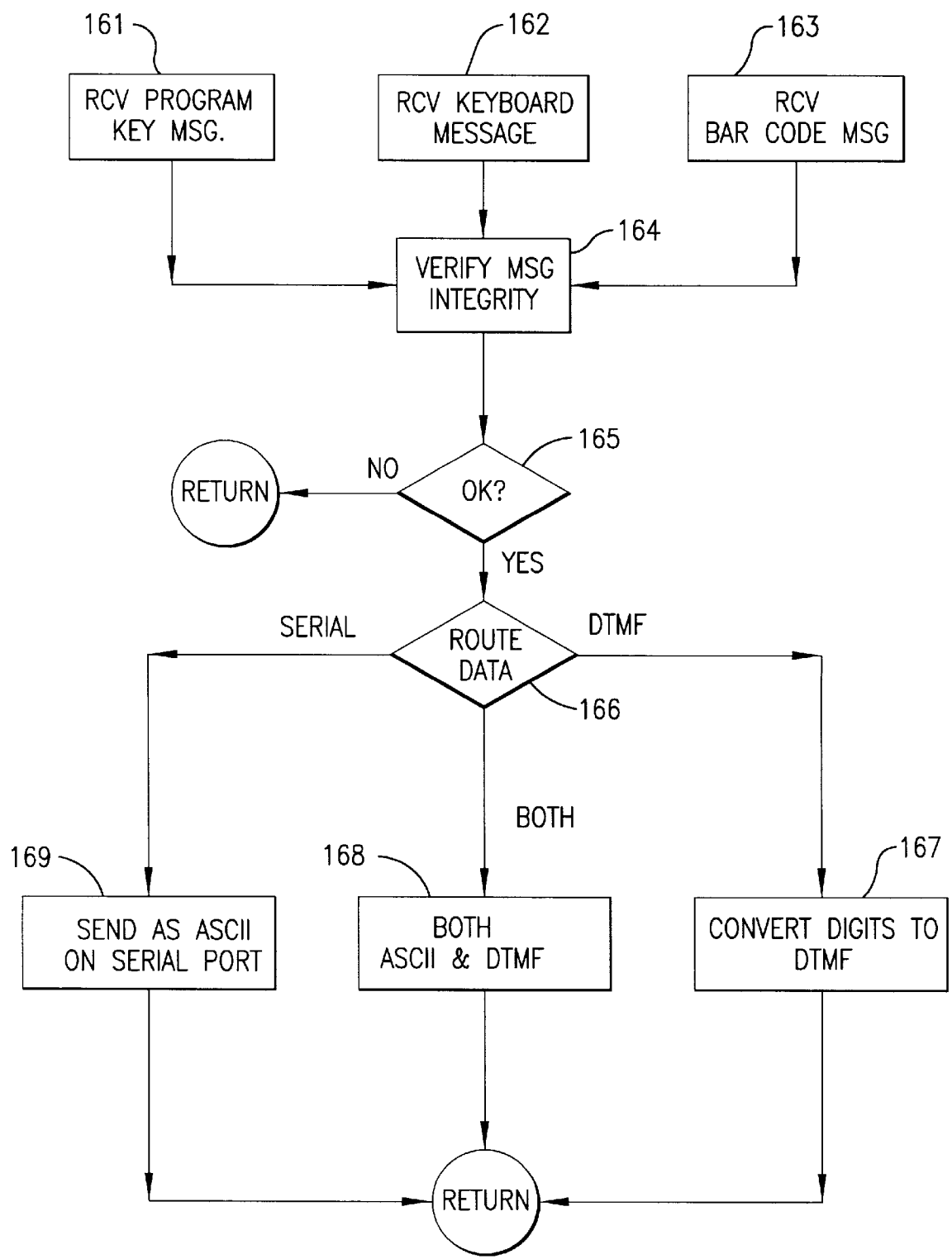

FIGS. 7a–c are flowcharts representing functions which are under control of software running on a computer or processor of a base station.

DETAILED DESCRIPTION

I. System Overview

Figure 1:
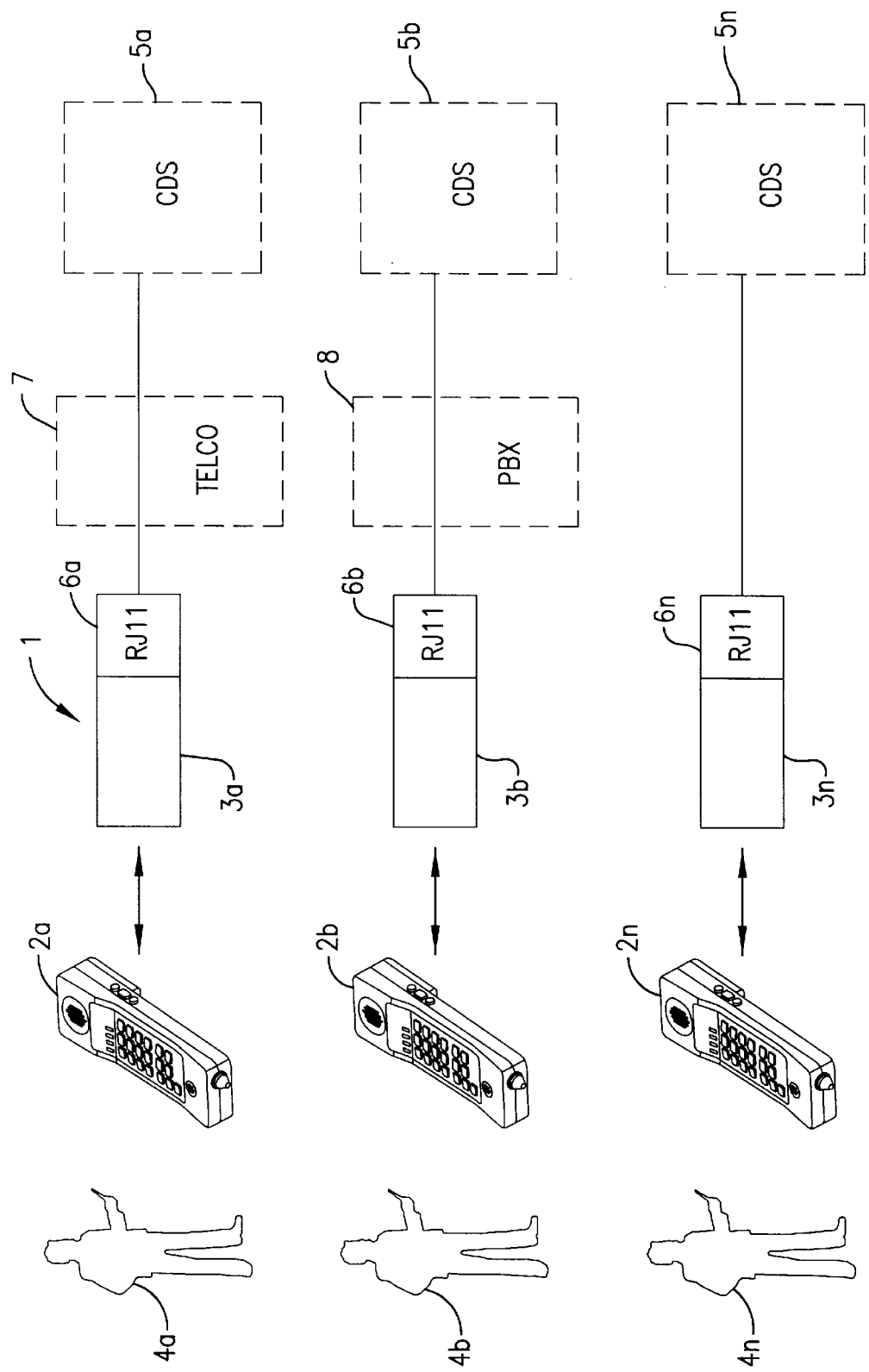

With reference to FIG. 1, the universal dictation input system 1 includes one or more portable, 900 MHz type, wireless dictation device ("WDD") 2a, 2b and 2n (n>2), and at least one stationary 900 MHz type base station 3a, 3b or 3n (n>2) which communicate with one another over RF communication channels. The free life like outlines of a person 4a, 4b and 4n (n>2) represent users of the WDDs who, in one embodiment, are doctors and other health care providers such as physician assistants, nurses and technicians. Doctors, for example, speak into the microphone of a WDD to record patient specific information win the memory of a computer controlled, centralized dictation system ("CDS") 5a, 5b and 5n (n>2) which becomes part of the patient's hospital record. A patient's oral record on the CDS is transcribed into English or another natural language by a person who listens to the playback of the stored speech. A base station includes at least one standard, RJ11 port 6a, 6b and 6n (n>2) adapted for mating, directly or indirectly, with a RJ11 port, or equivalent, of an analog or digital dictation system 6, commercially available from several different vendors.

To be compatible with the present universal input system, a CDS must be of a type which permits a dictation session to be initiated and conducted by issuing commands to the CDS in the form of DTMF tone signals. Examples of various commercially available digital CDSs include: the IBM™ digital dictation system running under an operating system of an IBM AS/400™ mini-computer; the Lanier OS/2 dictation system, a PC based system running under IBM's OS/2 operating system; the Lanier model 4800 dictation system; Dictaphone Corporation dictation systems including models DX1000™, DX1500, DX2000, DX3000, DX4000, DX7000, DX7700; DX8000 and the StraightTalk™ and Straight TalkPlus™ dictation systems. Examples of analog CDSs include: the Lanier Messenger™ system and the Dictaphone MVP™ system.

The base stations 3a, 3b and 3n depicted in FIG. 1 are coupled to the CDSs 5a–n over three different paths, representative of multiple possible paths. Base station 3a represents a connection to the CDS through the public switched network 7 consisting of one or more switches of one or more public telephone companies (singularly or collectively referred to as the "TELCO" or "TELCOs"). This connecting path serves, for example, health care providers located in a remote laboratory or clinic who call the main facility of a parent hospital to conduct dictation sessions on a CDS located at that distant site. Base station 3b represents a connection to a CDS through a Private Branch Exchange 8 ("PBX" or "PBXs"), privately owned telephone switches located in one or more separate facilities of a hospital, for example. Clearly, another available path between a base station and CDS includes one employing a combination of multiple PBX and TELCO switches. Base station 3n represents the direct connection of a base station 2n to an input port of a CDS without going through a PBX or a TELCO switch.

Only one WDD at a time is permitted to communicate through a particular base station to a CDS, but two or more doctors having their own WDD can alternately share access to the same base station, one at a time. One doctor cannot access the base station with the WDD once the other has done so. Only one base station may be coupled directly to a single RJ11 port of a CDS. However, to some commercially available CDS's employ multiple RJ11 ports for conducting multiple dictation sessions simultaneously. In that situation, each WDD is coupled to the CDS via a different base station. Furthermore, a dictation session can be established with two or more different CDSs (not simultaneously) through the same base station by providing the WDD with the dialing addresses of two or more CDSs or, of two or more RJ11 ports on a single CDS.

Figure 2:
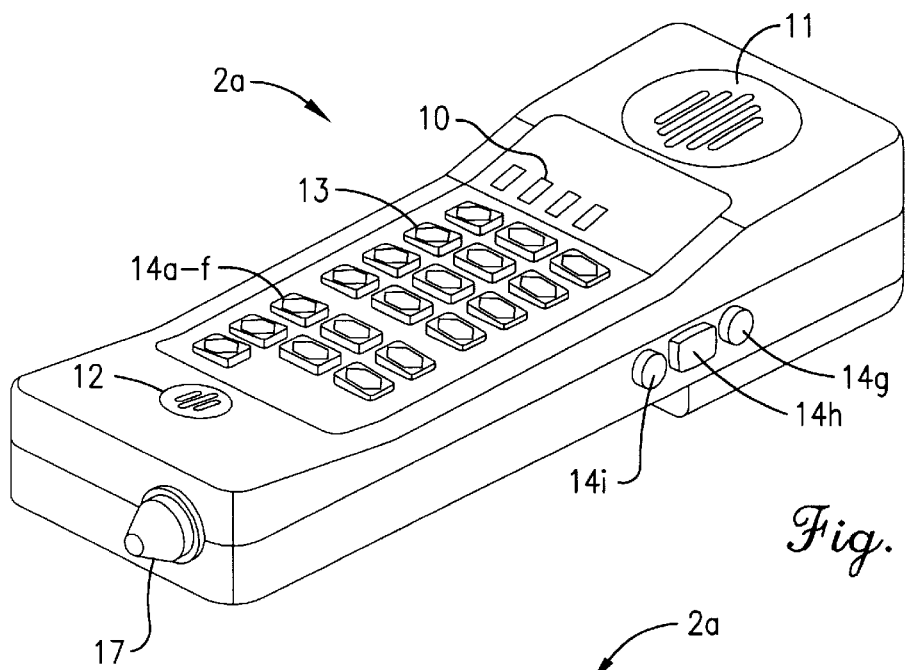
FIG. 2 is a perspective view of one embodiment of a hand held version of a WDD showing on a top surface of a housing, a microphone, speaker, four LEDs, a dialing keypad and programmable keys, and on a bottom surface a portion of a bar code reader. Three programmable keys are also shown on the right side of the WDD.

Turning to FIG. 2, the WDD 2a, representative of all WDDs 2b–2n, includes a speaker ("spk") 11, a microphone ("mic") 12 (or equivalent, mounted on a hands-free head set), standard dialing keypad 13 and ten programmable keys 14a–j. A standard, extended key telephone keypad includes four additional keys, C1, C2, C3 and D1 located in a row next to the row containing the 3, 6, 9 and * keys. Some CDS systems employ the DTMF digits A, B, C, and D associated with the C1, C2, C3 and D1 keys as commands to conduct a dictation session. Accordingly, the WDD of the embodiment under discussion is equipped with keys 14g–j to make available the additional DTMF digits for operation with CDS systems which respond to commands associated with the A–D digits. Of course, keys 14a–j can be programmed to provide other functions because these keys are all programmable. In one embodiment, programmable key 14g, when released, after being pressed down, generates the code for the "C" DTMF digit; the programmable keys 14h and 14j produce the code for the "B" DTMF digit when released after being pressed down; and the programmable key 14h produces the code for the "D" DTMF digit when pressed down.

The programmable keys 14g–j are capable of representing two states, and hence two codes: the first state being associated with pressing down of a key (or sliding it forward) and the second state with releasing the key, allowing it to rise back to its initial position (or releasing the key, allowing it to slide back to its initial position). In the disclosed embodiment, programmable keys 14 a–f are fo single-state keys and keys 14g–j are two-state keys. For example, the middle programmable button or key 14h on the right side of WDD 2a (FIG. 2) gives rise to both record and stop record CDS commands. When pressed down, key 14h generates a CDS record command and when released, generates a CDS stop command. A dictation period continues as long as a doctor keeps button 14h held in the down position, and the recording of the dictation ceases automatically when the button or key 14h is released.

In a preferred embodiment, programmable keys 14g, 14h and 14i are programmed for easy access by a user to selected CDS commands without hunting for the digits on the keys among keypad 13 to which substantially all CDSs respond. Key 14g is programmed to generate a "rewind to start" command when pressed down and to generate the "play" command when released. Key 14h is programmed to produce a "record" command when pressed and a "stop" command when released. Key 14i is programmed to generate a "fast forward to end" command when pressed and a "stop" command when released. These three keys are located on the right side of the housing of WDD 2a (FIGS. 2 and 3) to permit a person to hold the WDD in the palm of the left hand with the keypad 13 facing toward the user. In this position, it is convenient for the user to press the keys 14g–i with the index, middle and ring fingers of the left hand.

Figure 3:
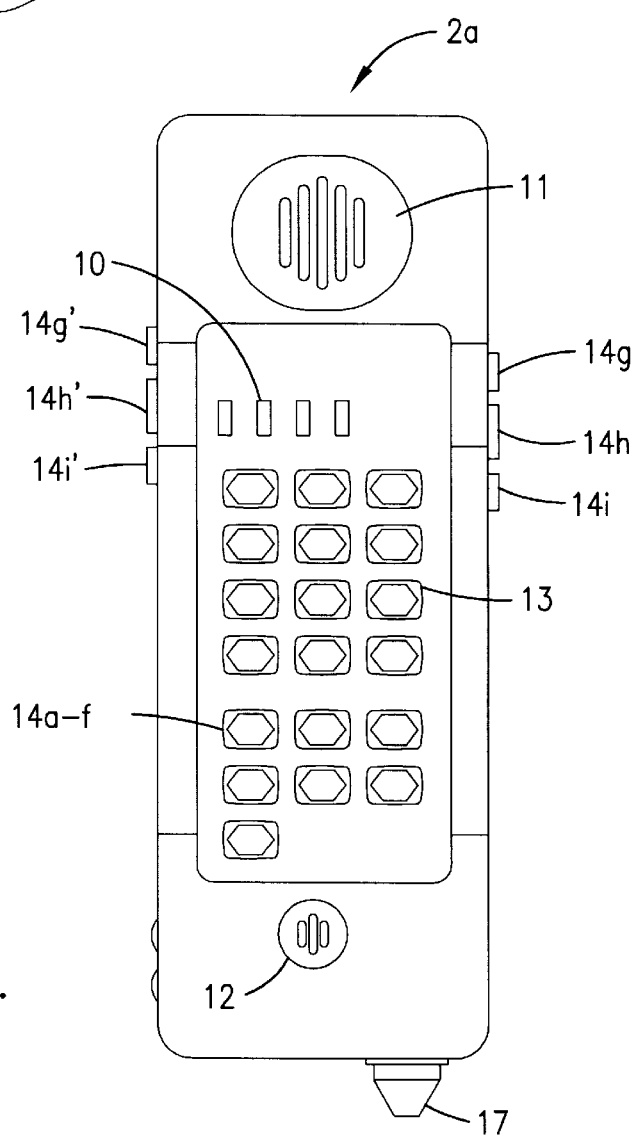
FIG. 3 is a plan view of an another embodiment of the WDD of FIG. 2 wherein three additional programmable keys are located on the left side of the WDD which provide the identical functionality of the three keys or the right side of the WDD housing.
Figure 4:
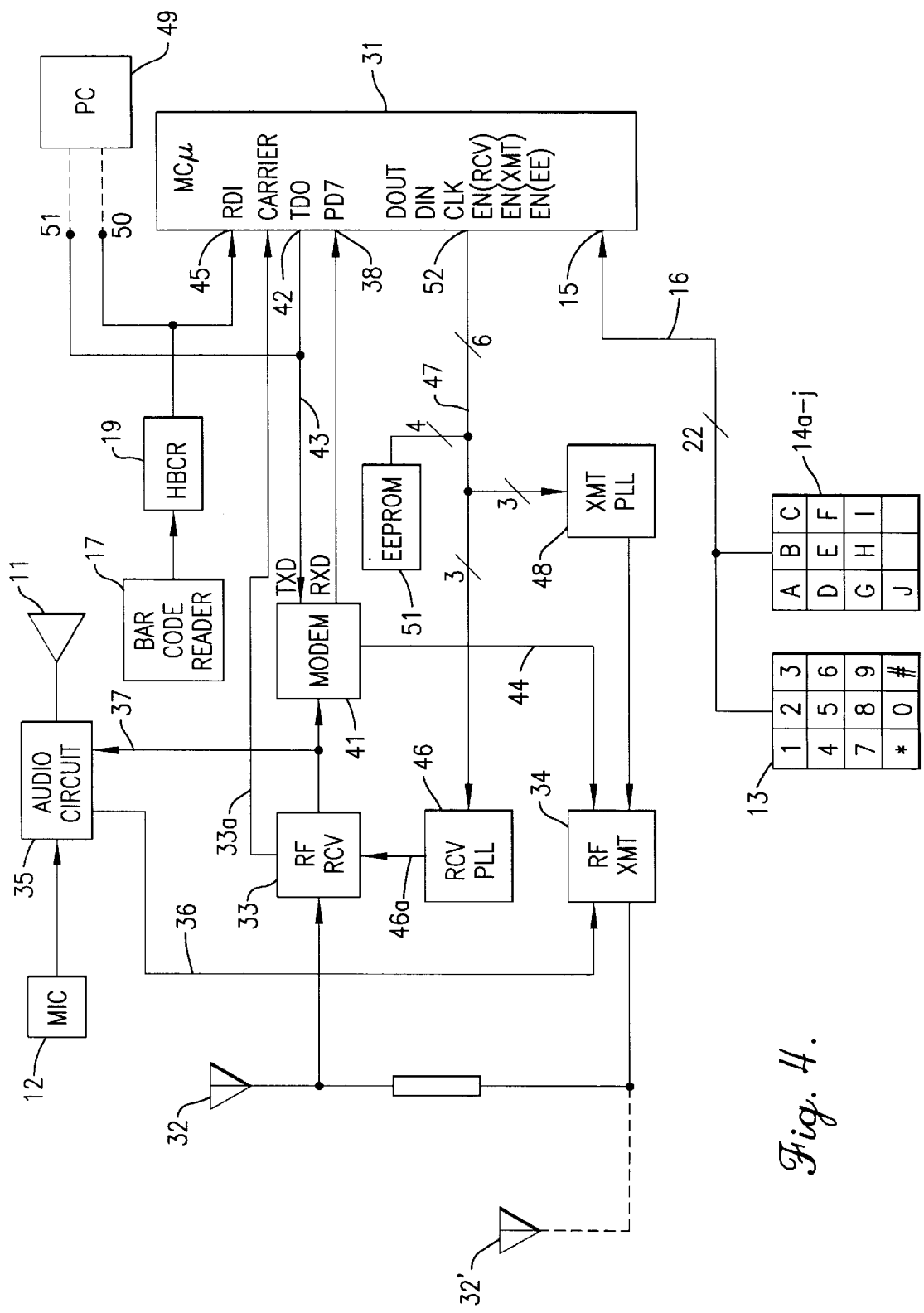
FIG. 4 is an electrical schematic diagram of a WDD.

Programmable key 14j is a voice recognition key located on the left side of the WDD housing and is shown in FIG. 4. The key 14j is a single key which occupies a position on the left side of the WDD of FIG. 2 which corresponds to the location of programmable key 14h' on the left side of the housing of the WDD of FIG. 3.

FIG. 3 represents yet another embodiment of the WDD 2a wherein a set of parallel keys 14g', 14h' and 14i', electrically and functionally equal to keys 14g–i are provided on the left side of the WDD housing directly opposite keys 14g–i The 14g'–i' keys are wired in parallel to their counterparts among keys 14g–i to provide ease of operation for a left-handed person for controlling the rewind, record and fast forward functions, for example, of a CDS. Of course, a left or right handed person is able to hold the WDD with either the dominant or weaker hand and manipulate the three keys with the fingers of the holding hand to control a dictation session.

A bar code reader 17 is represented in FIGS. 2 and 3 by a truncated cone including a part of the optics of a bar code reader for focusing light onto an array of charge coupled devices located inside the housing of WDD 2a. The bar code reader enables a doctor to capture the data on bar code patterns printed on various objects, including labels attached to a patient's ID bracelet, chart and laboratory samples, for example. Certain CDSs have data entry routines for accepting numeric data captured by bar code reader 17, as well as data originating with a dialing keypad and, in the present invention, with the programmable keys.

The bar code reader is ready for use while the power to the WDD is "on". A WDD is powered up and down by pressing, sequentially, a hard wired power on-off button or switch (not shown) coupled to the WDD's battery. Passing or moving the bar code reader over a bar code pattern, on a label attached to an object or directly printed on the object, captures the data represented by the printed pattern. The WDD temporarily processes the scanned bar code data and transits the data, in the form of a message or packet ("pckt"), to the base station and from there to a CDS in the form of DTMF tone signals for entry into a data field or format provided by the CDS computer on which the dictation session is conducted. The CDS associates the data with the dictation session in progress.

Examples of bar code data employed in the health care industry includes those relating to: a patient's ID number; chart of vital signs; medicine containers; EKG graphs; X-ray films; and vials of blood and other body fluids.

Information transmitted between a WDD 2a and a base station is either in an analog or digital signal form Audio information is in analog signal form generated in real time when a doctor speaks into the microphone of a WDD 2a. An audio circuit coupled to the microphone produces a clipped, analog signal representative of the doctor's oral utterance. The analog signal is directly applied from the audio circuit to an RF transmitter for transmission in real time to the base station. The base station routes the voice information from the WDD directly to the called CDS.

All information in a digital data form is bundled into a unique standard packet or message which identifies the data type. The digital data is generated in response to a doctor pressing a key among keypad 13, among the programmable keys 14a–j, or by passing the bar code reader 17 over a bar code pattern. Each keypad key is assigned a one byte character code from among the international standard ASCII character code set. The ASCII code set includes the digits 0–9, the English alphabetic characters a–z, in both upper and lower case, and a plurality of editing and other symbols including the * and # characters. Specifically, because keypad 13 is a dialing keypad, the individual keys are assigned one of the ASCII codes for the characters 0–9, *, #, A, B C and D. Similarly, each key among the programmable keys 14a–j has one or more codes of the ASCII code set associated with it. For example, a speed dial key has a string of ASCII character codes associated with it, including an arbitrarily selected ASCII character code representing an toggle hook signal followed by a ASCII character representing a pause or a sting of said pause characters, and a string of dialing digits, selected from among the dialing digits 0–9, *, #, A, B, C and D associated with the keypad 13, collectively representing the dialing address of a desired CDS.

WDD 2a sets up a dictation session with a CDS 2a when a doctor dials a three, four, seven, ten, or greater number of dialing digits, as may be required, to connect the WDD to a particular CDS. The CDS must be one with which the doctor, or other health care provider, is authorized to communicate. Once connected to the CDS through base station 2a, the doctor responds to audio prompts (synthetic speech) initiated at a CDS and passed back through a base station from the CDS to a doctors WDD. Typically, the first prompt from a CDS is a request for an identification number which the doctor keys into the data field of the CDS using keypad 13, or alternatively, the bar code reader 17 and a programmable key among keys 14a–f, for example. Next, a CDS prompt is likely to request a password be keyed in by hand as a further safeguard to limit access to patient information stored at the CDS.

Once logged on to the CDS, the doctor is requested by certain CDS prompts to enter alpha numeric data, if any, in a format suitable for entry into a structured data field defined by the connected CDS. The data entered typically pertains to the patient and includes care and billing related information. Bar code information scanned by bar code reader 17 is sent to the CDS at this time for inclusion among the data fields in response to specific prompts issued to the WDD by the CDS. After entering data via the keypad keys, programmable keys, or the bar code reader, or skipping the data entry feature, the CDS waits for the doctor to transmit a "record" command to mark the beginning of the first recording period of a dictation session.

A dictation session is ended, for example, after one or several recording periods, by the doctor sending the command for "end dictation" to the CDS. A dictation session is also ended in other ways. For example, when a WDD issues an on-hook signal packet to the base station 3a, the base station responds to the on-hook packet by generating an on-hook signal which terminates the base station's connection to the CDS. Alternatively, prior to the CDS issuing an on-hook signal to the base station, a CDS of a particular vendor may provide a series of synthetic voice prompts offering a doctor the option to start a new dictation session for a different patient or, for example, connect the doctor's WDD to some other service available with the CDS, such as a voice mail service.

The list of fifteen commands provided in Table 1 below is an example of a set of dictation commands associated with a twelve key keypad 13 employed by a representative CDS. In the present embodiment, certain of the programmable keys give rise to the DTMF digits A, B, C and D of extended standard dialing keypad. Because certain of the programmable keys are two-state keys, or all configured as two state key, and not all the states are needed for the following fifteen commands, an extended set of commands is possible with the same number of programmable keys by employing unused states of the programmable keys.

TABLE 1

| Button/Key | ASCII Code | Command | Comment |
| --- | --- | --- | --- |
| keypad key 7 | 7 | Rewind | |
| keys 14h up and 14j up | B | Stop | 14h and 14j programmed for 2 states: each up during second state |
| key 14h down | D | Record | 14h programmed for 2 states: down start record, up stop record |
| 14g key down or key 7,7 | 77 | Rewind to start | 14g programmed for 2 states: key down to start rewind to start |
| 14i or keypad 4,4 | 44 | Fast forward to end | 14i programmed for 2 states: down start Fast forward to end, up stop |
| keypad # | # | Insert | |
| keypad 6,8,2 | 682 | Notify | |
| keypad 4 | 4 | Fast forward | |
| keypad 9 | 9 | Mark Impression | |
| key 14g, up for play | C | Play | Key 14g, down for rewind to start |
| keypad * | * | Cut | |
| keypad *,8 | *8 | Cancel dictation | |
| keypad 6 | 6 | Priority | |
| keypad 8 | 8 | End dictation | |
| | Spare | | For future use |

A voice recognition ("VR") feature of WDD 2 gives a doctor the option to speak the commands listed in Table 1, for example, rather than looking for a particular key to press. The interpretation of the spoken commands occurs at the base station which forwards a DTMF tone(s) character(s)

representing a dictation command to a CDS. Base station 3*a* includes a digital signal processor, programmed with a voice recognition algorithm, for translating the voice commands into ASCII character codes corresponding, for example, the characters representing the commands listed in Table 1.

The WDD 2*a* and the base station 3*a* communicate via a fill duplex RF 900 MHz radio link. Each base station is assigned a single, unique, fill duplex RF channel for communicating with one or more WDDs. Operating at up to 900 MHz, the universal input system, comprising a WDD and base station pair, communicates over selected channels among 240 channels, i.e. channel pairs. Prior to being placed into service, a WDD is programmed with enabling code which permits a WDD to transmit and receive over certain ones of 232 channels. Eight channels are reserved for testing, diagnosing and programming among a WDD, base station and other devices, including a Microsoft™ Windows programmed personal computer.

In the embodiment under discussion, a WDD is programmed to communicate with up to 232 base stations over the individual channels exclusively assigned to each base station. Each WDD includes adequate non-volatile memory to support up to nine programmable keys for speed dialing the addresses of nine different CDS. In the present embodiment, programmable keys 14*g–j* are assigned tasks leaving keys a–f available as speed dial keys if so desired. Additional CDSs are addressable from a WDD by keying in their dialing address by hand on keypad 13 into the WDDs for transmission to the base station.

A WDD includes a frequency scanner which sequentially tunes the device's RF receiver to a frequency for reception over each authorized channel assigned to a WDD until the WDD's RF receiver detects an authorized channel assigned to a base station which is not presently communicating with another WDD and immediately establishes a radio link with that idle base station. Two doctors, each having a WDD authorized to communicate, for example, only with the same two base stations X and Y, compete with one another for the use of base stations X and Y. When one doctor links his/her WDD to base station X over its assigned channel, the RF receiver of the second doctor's WDD is tuned sequentially and cyclically to the two channels assigned to base stations X and Y. Consequently, the second doctor's WDD detects RF energy transmitted between the first doctor's WDD and base station X indicating that station X is busy. The second doctor's WDD proceeds to tune its RF receiver to its other authorized channel, the channel assigned to base station Y. If base station Y is busy, the second doctor's WDD cyclically scans among the same two channels until one of the base stations X or Y becomes available, or a limit timer expires. Once coupled to a base station, a WDD is able to connect to any CDS with which the doctor has log on rights, provided the dialed CDS is not busy. If a selected CDS is busy, the physician must try to access it later.

In the above example, the WDD is authorized to communicate with only two base stations. However, it should be understood that an embodiment is possible wherein codes for all 232 channels are programmed into a WDD and all are enabled to permit a WDD to communicate with 232 base stations over a like number of RF channels. Also, the foregoing WDD is programmable to enable only a certain number of the 232 codes stored in non-volatile memory, twenty for example, to permit communications with just twenty, for example, of the 232 base stations.

II. The Wireless Dictation Device ("WDD")

The WDD 2*a* of FIG. 4 is also representative of the other WDDs 2*b*–2*n*. WDD 2*a* comprises a mobile, modified 900 MHz transmitter/receiver, or transceiver, programmed to communicate with at least one base station 3*a* comprising a modified, fixedly located, 900 MHz transmitter/receiver, or transceiver. The functions of the WDD are controlled by the programmed microcomputer computer unit ("MCU") 31. The MCU, in the present embodiment, is a Motorola MC68HC705CBA microcomputer which includes four sets of eight, input/output ports. A one bit data direction register associated with each data port is programmable to setup a port as either an input or an output port. Other embedded control processors can be used. Each of the twelve keys of keypad 13 and the ten programmable keys 14*a–j* (shown in FIGS. 2 and 4) are coupled by a wire matrix to input ports 15 at MCU 31 over the appropriate size bundle of lines 16 to accommodate the twenty-two keys.

Pressing one of the twenty-two set or twenty-six set of keys causes MCU 31 to transmit a packet from its serial output port 42 (TDO) to the input of modem 41. The packet contains the particular ASCII character code or codes associated with the pressed key. The modem frequency modulates the packet in accordance with a technique known as frequency shift keying ("FSK") and the FSK signal is routed to RF transmitter 34 for transmission to an authorized base station.

The WDD has one antenna 32 located inside the WDD housing. The antenna is coupled to both RF receiver ("RCV") 33 and RF transmitter ("XMT") 34. The antenna 32' is a phantom component which does not exist (shown in dashed lines) and is depicted solely to help locate the RF transmitter among the components.

When a doctor speaks into the microphone 12 of WDD 2*a*, the resultant analog voice signals are amplified and shaped by audio circuit 35 and routed to transmitter 34 over line 36 under the control of MCU 31. Transmitter 34 sends the voice signals to the base station 3*a* which routes the analog voice signals directly to the connected CDS.

All data generated at the WDD and transmitted to the base station consists of one or more, one byte, codes representing characters among the ASCII character set. A doctor initiates the transmission of data by pressing one of the keys among keypad 13 and the programmable keys 14*a–j* or by scanning the bar code reader 17 over a bar code pattern associated with an object. Specifically, the ASCII characters codes for the 0–9, * and # DTF digits are mapped to the corresponding keys of keypad 13 and the ASCII character codes for the extended DTMF digits B, C and D are mapped to the programmable keys 14*g–j*. The programmable keys have either a single ASCII character assigned to them or a string of ASCII characters. For example, key 14*b* is a hook toggle key and has an ASCII character code for generating an off hook signal, when the key is in presently in an on hook state. A base station recognizes the off hook signal as a request for access directly to a CDS 14 or indirectly through a PBX or TELCO switch. The hook toggle switch changes to an on hook state when pressed subsequently which signals the CDS directly or indirectly through a PBX or TELCO switch to terminate the connection to a CDS.

Speed dial keys among keys 14*a–j* have a string of ASCII characters associated with them, for example, a string of characters representing: (1) a pointer to locations within non-volatile memory for mapping the correct DTMF digit to each programmable key among keys 14*g–i* for the "rewind to start", "record" and "fast forward to end" commands of the CDS address by this speed dial key; (2) an off-hook signal; one or more short pause signals; and a combination of certain ones of the dialing digits 0–9, *, #, A, B, C and D, as needed. Typically, CDS systems recognize certain ones or combinations of the dialing digits 0–9, *, #, A, B, C and D as specific dictation commands (see table 1).

The data generated from the keypad 13, keys 14a–j, the bar code reader 17 and the WDD's processor are transmitted to a base station in packets ("pckts"), or messages, which are distinguished from one another by type. Generically, all packets take the form of: (a) a header; (b) type; (c) the total packet length, limited to 252 bytes; (d) the data; and (e) a check sum, an error value. The data portion of the packet includes up to 252 bytes, whereas, each of the other four portions of the packet consist of a single byte. In a current embodiment, the packets contain 29 bytes of data. The header identifies the start of a packet and the data type identifies the origin of the data, i.e., the keypad, programmable keys, the bar code reader, the system and data types originating at other sources, for example, data stored in WDD memory. The check sum is an error identification value and the length packet is expressed in bytes and includes the checksum.

The ASCII codes transmitted by the WDD are translated at the base station into DTMF tone signals corresponding to dialing digits, for setting up a connection to a CDS, and, corresponding to CDS dictation commands, for conducting a dictation session. When the base station first links up with a WDD, the WDD transmits system packets which include data necessary to setup the base station for certain operations. By way of example, the setup information includes dictation commands associated with a given CDS which the base station uses to map ASCII codes to DTMF tone signals to be sent to a CDS. The ASCII code represents CDS commands produced at the output of voice recognition software in the base station running on a digital signal processor ("DSP"), discussed below in connection with the base station. The downloaded CDS command set is used by a base station to convert ASCII codes into DTMF tone signals recognized as commands by the CDS. Table 1 lists a representative command set.

The base station translates received WDD keystroke-generated FSK signals into DTMF tones and routes the tones to the CDS to setup and control a dictation session. In the reverse direction, voice signals (synthetic) received by a base station from a CDS are directly transmitted from the base station back to the WDD. At the WDD, the voice signals are applied from receiver 33 over line 37 directly to audio circuit 35 and speaker 11 where the speech is reproduced. FSK signals received by a WDD from the base station are directed to modem 41. The modem demodulates the signals and passes the extracted data to MCU 31 at port 31, pin PD7. The MCU decodes and acts on the data. By way of example, the WDD receives setup data from the base station when the WDD and base station first establish communication.

As noted above, the bar code reader 17 is able to read barcodes at the time the power to the WDD is turned "on." Bar code data, captured by passing the bar code reader 17 over a bar code label, for example, is processed by microprocessor 19, a Hewlett Packard HBCR 2211 bar code decoder. The decoder converts the bar code numerical data into the corresponding ASCII character is codes and forwards the ASCII data to the serial input port 45 of MCU 31. The MCU, in turn, formats the bar code ASCII code data into a bar code "type" packet and routes the packet from output port 42 ("TDO") over line 43 to modem 41. Modem 41 modulates the bar code packet data and applies the FSK output over line 44 to the transmitter 34 which transmits the packet to the base station.

Following actuation of the power "on" switch (not shown), the WDD initiates a search for an available, that is, not busy, authorized base station among the total number of authorized channels assigned to the WDD. The search begins with the loading a forty-eight bit scan code into receiver synthesizer 46 identifying a channel among the stored authorized channels assigned to this WDD, which may be all 240 possible channels (less test channels) or some smaller number of channels. The scan code for channel one, for example, causes synthesizer 46, under control of MCU 31, to tune receiver 33 to that channel, i. e. channel one.

A channel carrier loss detector circuit, included within RF receiver 33, produces a carrier detection signal upon detecting the presence, at the receiver, of the channel carrier signal to which the RF receiver is tuned, channel one in the present example. The detection of the carrier signal assigned to a base station means that the base station is communicating with another authorized WDD because, by definition each channel is unique to each base station. MCU 31 monitors the carrier detection signal over line 33a and responds to the detection of carrier by tuning the RF receiver to a next, if any, authorized channel, for example channel two, among the plurality of authorized channels associated with the WDD.

When a WDD includes a plurality of authorized channels, the MCU sequentially proceeds to from one channel to the next, successively, until all channels have been tested and then, cycles back to the first channel, until a free or available base station is identified. A WDD assigned just one authorized channel continually tunes the RF receiver to that channel until it becomes available. The scan process is stopped when a time out counter expires before an available base station is located. This conditions turns "off" the power to the WDD.

When the channel one base station is available, receiver synthesizer 46 is already loaded with the receive scan code for channel one and MCU 31 proceeds to load transmitter synthesizer 48 with the transmit scan code for channel one. MCU 31 next initiates the transmission of a data packet, an ID type, to the channel one base station thereby establishing communications with the detected base station. The ID packet includes the WDD's identification number ("ID"). The channel one base station decodes the packet, forms a new ECHO ID packet containing the WDD's ID and transmits the ECHO ID packet back to the WDD. By comparing the returned ID to the sent ID, the WDD verifies that radio communication exists between the WDD and the channel one base station.

The receiver and transmitter scan controllers 46 and 48 are 1.1 gigahertz ("GHZ") phase-locked loop ("PLL") frequency synthesizer which, along with a voltage controlled oscillator and an intermediate frequency ("IF") demodulator comprise the RF receiver 33 and, along with an amplifier for driving the antenna, comprise RF transmitter 34. The synthesizers 46 and 48 are shown separately to emphasize their function. The synthesizers 46 and 48 enable the RF receiver 33 and transmitter 34 to be selectively tuned to each of the 240 available channels, as required. Specifically, the synthesizers are a product of the Motorola™ Corporation, part number MC145191 PLL.

If a scanned channel is enabled, the voltage at the PD output pin of the receiver synthesizer is applied to the input of a voltage controlled oscillator ("VCO") at RF receiver 33. The PD output pin voltage value tunes the receiver's VCO to oscillate at an authorized channel frequency. Similarly, the voltage at the PD output pin of the transmitter synthesizer is applied to a VCO located within the RF transmitter 34 and tunes the transmitter VCO to oscillate at an authorized channel frequency.

MCU 31, from DIN, CLK, EN(RCV) and EN(XMT) ports, serially transmits six bytes of channel select data to the DIN port of the RCV PLL and XMT PLL synthesizers 46 and 48 over a first common line, by issuing to the PLLs a series of clock ("CLK") signals over a second common line. Separate enable signals EN(LCV) and EN(XMT)) are sent to each of the two synthesizer over third and fourth to permit the two PLLs to operate at separate times.

The four lines from the MCU to the synthesizers are depicted as among a six wire bundle, originating at six ports 52 at MCU 31. The DIN (data in) and CLK (system clock) lead lines are shared by the two PLLs with EEPROM 51 extending between like named ports at the two PLLS and the EEPROM. The fifth and sixth lines among the bundle of 6, couple the EN(EE) (enable) and DOUT (data out) ports at the EEPROM to like named ports at MCU.

The parameters defining the authorized channels and other setup data for a WDD are written into and read out of EEPROM 51 over the DIN and DOUT lines by a series of CLK signals while the EEPROM is enabled over the EN(EE) line. The customizing information written to and read from the EEPROM is controlled by a WDD connection application program running under a Microsoft™ Windows software installed on personal computer ("PC") 49. PC 49 communicates with MCU 31 over serial input/output ports coupled to serial input/output ports 42 ("TDO") and 45 ("RDI") at MCU 31. The keys of keypad 13, the programmable keys 14a–j and the bar code reader have specific codes associated with them programmed into EEPROM 51 to customize the WDD to provide several special speed dialing and access to the command sets at least for three CDSs.

There are several different bar code conventions employed in the health care business sector, certain ones of which are mapped into EEPROM 51. The following commercially used codes are understood to be used in hospitals, clinics and HMO facilities: Code 39; UPC/EAN; Codabar; Code 128; code 11 and Interleave 2 of 5 code. EEPROM 51 is configured to contain the codes for the various types found in a particular health care campus but is not limited to these.

III. The Base Station

Figure 5:
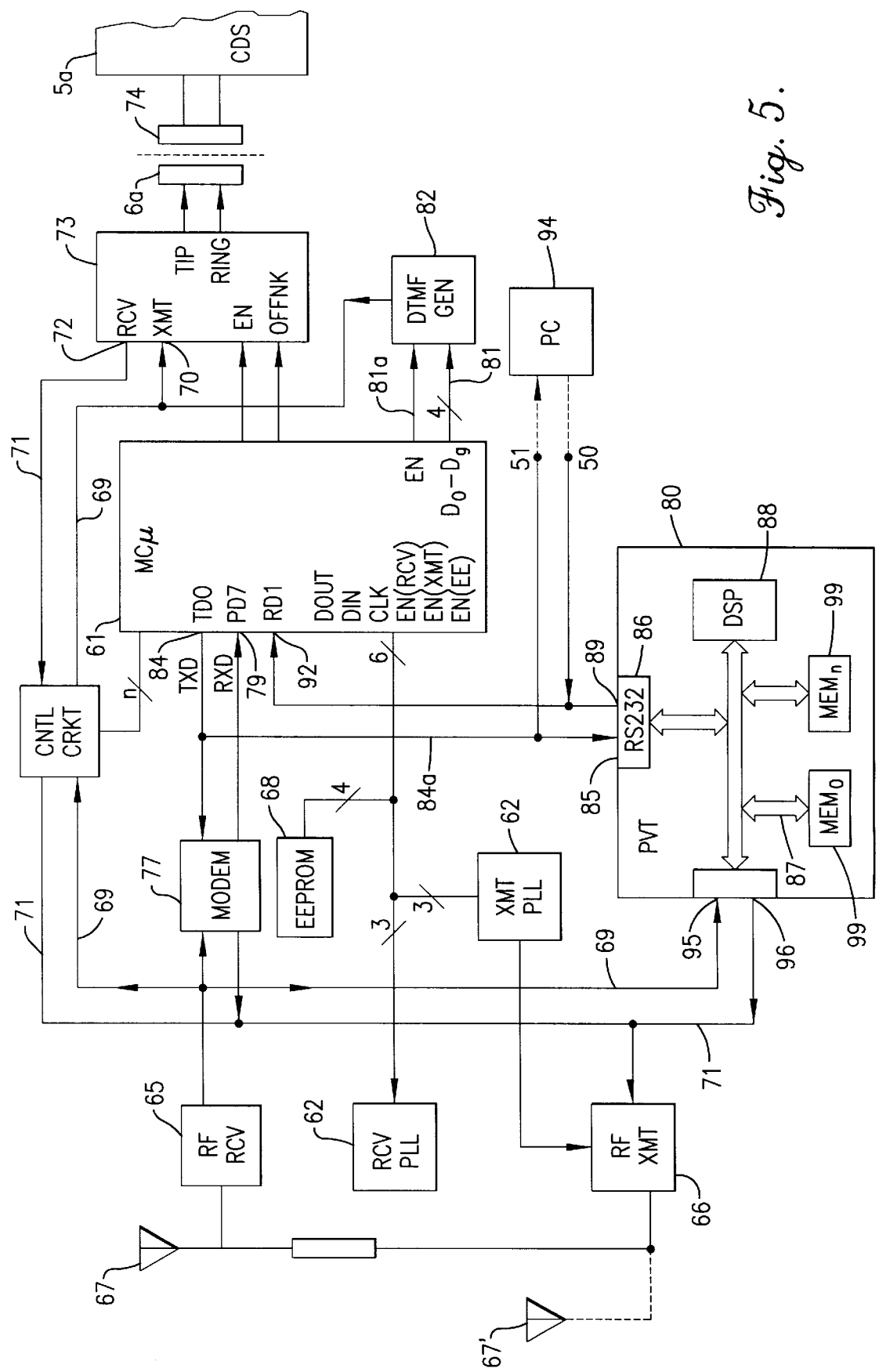
FIG. 5 is an electrical schematic diagram of a base station.

FIG. 5 is a schematic diagram of base station 3a which is representative of the other base stations 3b–3n. The base stations, like the WDDs, include a modified 900 MHZ radio, transmitter/receiver, or transceiver, adapted for communication with the 900 MHZ radio of one or more WDDs. A base station employs several of the same components of a WDD including a MCU 61, a Motorola MC68HC705CBA microcomputer employed in WDD 2a, which includes four sets of input/output ports and one bit data direction registers associated with each MCU port which is programmable to setup a port as either an input or an output port.

The basic role of base station 3a is to establish a communication path between a CDS 5 (FIG. 1) and a WDD 2a, provided the WDD is authorized to communicate with a given base station. As described in connection with the discussion of the WDD 2a, base station 3a waits for a transmission from a WDD of data for setting up and conducting a dictation session with a CDS, over the channel exclusively assigned to the base station. The WDD, after determining that the base station is idle, sends an ID packet thereby establishing communications with the intended base station. The base station interprets the packet, repackages the WDD's ID in an ECHO ID packet and transmits the new packet back to the WDD. The return of the ID to the WDD verifies the establishment of a communication link with the base station.

The base station components include RF receiver 65, RF transmitter 66 and modem 77 coupled between MCU 61 and the transmitter and receiver. PLL synthesizers 62 and 63, also coupled between MCU 61 and the transmitter and receiver, respectively, tune the base station to the exclusive channel pair for transmission and reception. The synthesizers operate in the same manner as those in the WDD. The synthesizers are coupled to the DIN, EN (RCV), EN(XMT) and CLK output pins of MCU 61.

The codes for tuning the base station to its assigned transmission and receive channel pair is stored in EEPROM 68 coupled to MCU 61 by the shared DIN and CLK lines extending to both the two PLLS and the EEPROM and by the two separate DOUT and EN(EE) lines coupled to like named ports on MCU 61 and EEPROM 68. The lead lines coupling the PLLs and the EEPROM 68 to MCU 61 are included in a six line bundle which corresponds to the six lines bundle discussed above in connection with the WDD.

MCU 61 is coupled directly or indirectly to a CDS through a PBX or TELCO switch, or a combination of such switches. Specifically, MCU 61 is coupled directly to the enable (EN) and off hook (offhk) pins of an industry standard line interface CH1840 chip 73 and indirectly to the transmit (xmt) pin of chip 73 through a standard DTMF tone signal generator 82. The output "tip" and "ring" pins of interface chip 73 mate with RJ11 jack 6a (see FIG. 1) for coupling directly or indirectly though switches to a CDS. RJ11 jack 74 represents a CDS's input/output interface to a base station.

MCU 61 is coupled directly to DTF generator input D0–D3 pins over a four wire bus 81 and an enable (EN) pin over lead line 81a. The DTMF generator produces DTMF tone signals necessary to dial the address of a given CDS and to issue dictation commands to a CDS, such as those listed in Table 1.

The base station also includes the personal voice translator ("PVT") 80 coupled to receiver 65 and transmitter 66 via lines 69 and 71, respectively. The PVT is also coupled to MCU 61 over lines 84a and 92a extending from the MCU serial input/output ports 92 (RDI) and 84 (TDO) to a RS232 serial interface chip 86. The PVT translates the oral commands, uttered by a doctor into a microphone at a WDD, into ASCII character codes corresponding to the command set for the particular CDS coupled to the base station. PVT 80 is a complete programmable device mounted on a printed circuit board, designed by CSL, Inc., which includes a Texas Instruments™ programmable digital signal processor ("DSP"), memory 99, data and address busses 87 and other components supporting the DSP 88, memory and busses.

The voice recognition algorithm which translates the voice into text, that is, ASCII character codes, is resident in the DSP and employs the command set downloaded to the base station following a WDD establishing a communication with the base station. The voice recognition software recognizes a set of about thirty words or phrases relating to dictation session commands, including such words and phrases as appearing in Table 1. The words for the symbols 0–9,* (star) and # (pound) are also included for direct dialing and data entry by voice recognition.

MCU 61 receives a start voice recognition ("VR") packet that alerts the MCU that voice signals subsequently transmitted to the base station are to be translated into ASCII codes representative of CDS dictation commands and the dialing symbols 0–9, *, #, A, B, C and D. The VR start packet is generated and transmitted when a doctor presses and holds down the two- state VR key 14j (FIGS. 2 and 4). (The VR key is assignable to any one of the two-state programmable keys 14g–j.) Consequently, the analog voice signals transmitted to the base station, while VR key 14j is pressed down, are routed by the base station MCU 61 directly to DSP 88 within the PVT. The DSP converts voice signals into ASCII commands and forwards the commands in PVT type packets to the serial input port 92 of MCU 61, over line 92a. The MCU, in turn, interprets the PVT packet and sends signals to the DTMF generator 82 to create the DTMF signals corresponding to the requested CDS commands or dialing symbols.

Base station parameters which customize a base station are loaded into EEPROM 68 from PC 94 executing a base station connection software application The customizing data, for example, includes the code to set the PLL transmitter and receiver synthesizers to the base station's exclusive channel pair and code which identifies special features of a base station not necessarily available in other base stations. Examples of special code is that identifying the base station as having a PVT for voice recognition and/or other features newly added to successive models or versions of a base station. EEPROM 68 is coupled to MCU 61 at MCU ports DIN, DOUT, CLK and EN(EE) over four lead lines coupled to like named ports at the EEPROM. EEPROM 68 is connected in the same manner as described above for the connection of the WDD EEPROM 51 to MCU 31, including the sharing of DIN and CLK lead lines with the base station PLL synthesizers 62 and 63.

IV. The Wireless Dictation Device ("WDD") Software

FIG. 5 is a flow diagram of the base station software for controlling the operation of a WDD 2a. The entry point into the program, represented by block 101, is reached when the WDD power "on" switch (not shown in FIGS. 1, 2 or 4) is pressed and released. With power on, function block 102 is encountered. Here, MCU 31 initializes all input and output ports and loads application variables, for example, the code for stating the sequential tuning of the receiver and transmitter PLL synthesizers 46 and 48, respectively, to an authorized channel In addition, all the program interrupts are enabled, receiver 33 is initialized and the transmitter 34 remains "off." Leaving the WDD's transmitter "off" avoids inadvertently having the WDD's receiver sense that a base station is busy by detecting carrier emitted by the WDD's own transmitter. As described earlier, a carrier signal detector which is part of receiver 33 alerts the MCU 31 over line 33a that a base station is busy when the detector senses the presence of carrier associated with a channel over which the WDD is attempting to connect to a specific base station.

At block 103, the software checks to see if one of the keys of keypad 13 were pressed when power to the WDD was switched "on." If no key among keypad 13 is pressed while the power is switched "on", the system enters the dictation routine, the default condition. Other routines are entered, upon pressing various keys on keypad 13. For example, the "2" key causes the WDD to scan all diagnostic channels; the "3" key causes the WDD processor 31 to issue a series of beeps from speaker 11, the total number of said beeps indicating the revision number of the firmware. The "4" key causes a test of the bar code reader; the "6" key allows remote access to the WDD for programming or otherwise supporting the WDD.

A WDD connection routine accessed upon pressing the "6" keypad key, while the power on button is pressed, enables an external device like PC 49 to access processor 31 at 9600 bits per second ("b/s"). The PC reads and writes data from and to EEPROM 51 through processor 31. The PC couples to the processor at serial input/output ports 45 and 42 and to the EEPROM from processor ports DOUT, DIN, CLK and EN(EE).

If one of the keys 1–6 among keypad 13 are not pressed, the system goes to block 104 of the dictation routine.

In the dictation routine, the first priority is to perform the diagnostic tests of blocks 104, 105 and 106. The block 104 routine checks the WDD's battery voltage level and issues a "low battery" fo warning by turning "on" the low battery LED if the battery voltage is below a predetermined threshold level. At the routine of block 105, the contents of two bytes within EEPROM 51 are tested for valid data to verify that the EEPROM has been configured for conducting dictation sessions with a CDS. If the EEPROM is not properly configured, MCU 31 causes the four LEDs to blink simultaneously for ten seconds after which the power to WDD is turned "off." The final diagnostic check is made at block 106 where the routine checks the EEPROM for impossible settings. An example of an impossible setting is one that indicates that no authorized channels have been enabled for this WDD.

At block 107, the WDD's receiver is programmed to scan or search for an available authorized base station. The receiver in the WDD is initial tuned to a first authorized channel to listen for transmissions between another WDD and the base station over the first authorized channel of this WDD. If the WDD's fast authorized channel is in use, the WDD's receiver is sequentially and cyclically tuned to the second, third and additional authorized channels until an idle base station channel is detected. At that point, the WDD immediately tunes its transmitter 34 to the carrier frequency for the authorized channel and sends, as represented by block 108, an ID packet to the connected or linked, authorized base station.

The WDD software at block 107 also includes a scanning time out counter. In the event that the WDD under discussion fails to link up with an authorized base station prior to the expiration of the time out, MCU 31 transmits a signal to the WDD speaker 11, to issue one warning beep and turns the WDD "off" by electrically disconnecting the battery. A user turns the power to the WDD "on" to continue a search for an available base station.

The base station interprets the ID packet received from the WDD and responds by repackaging the ID within an ECHO ID packet and transmitting the packet back to the WDD. Software associated with block 109 causes the WDD to interpret the receipt of the ECHO ID packet as an acknowledgment that radio communication exists with the intended base station. Software block 109 also alerts the doctor, or other user, that the WDD is linked to a base station by turning "off" the scan LED (among the four LEDs 10 shown in FIG. 2.)

Next, the WDD receives one or more packets of setup data uploaded from the base station, under the control of software represented by 110. The uploaded setup data sent to the WDD from the base station includes information pertaining to the base station's capabilities and features which vary among different models of the base stations manufactured and/or programmed at different times. Examples of specific uploaded information is that identifying the base station as including a PVT and/or a bar code reader.

The WDD transmits, or downloads, setup data to the base station under the control of software at block 111. The base station setup data includes that required by a base station to perform a task requested by a WDD which is not universal to all WDDs or to all CDS. An example of setup data downloaded from a WDD to a radio linked base station includes the command set for an intended CDS which is required by a base station having a PVT (FIG. 4) programmed for voice recognition. The command set is stored in local RAM memory within the base station only while the base station and WDD are linked together. The CDS command set for the currently coupled CDS enables the PVT to convert a spoken word or phrase among the attached CDS's command set into the corresponding ASCII character code or codes representing a specific CDS command sent to processor 61. Processor 61 translates the ASCII code to a DTMF digit and sends the digit to a CDS which recognizes the digit as a command.

Other significant data downloaded from a WDD to a base station includes data associated with a disconnect feature of the universal dictation system. The disconnect feature enables the base station to minimize or prevent loss of or damage to data at a CDS when the RF link between the WDD and base station is abruptly lost while the base station continues coupled to a CDS with a diction session in progress. For example, speech recorded at the CDS and data entered into CDS data fields during a dictation session might be lost, damaged or otherwise devalued to the user should the CDS not follow a normal shut down or exit procedure. If the CDS sends the incomplete dictation session to a transcriber, the user could loose the opportunity to review and edit what has been recorded. In contrast, when an orderly shut down is followed, the CDS can provide a way for the user to return to the interrupted dictation session to edit it or to continue the session.

The disconnect feature provides the base station with a disconnect string of data including, for example, the "8" DTMF digit for the "end dictation" command, for a CDS having the command set of Table 1, followed by an "on hook" signal. These two signals, and others that are required or preferred for a given CDS, for example a pause signal, enable the base station, in response to a sensed loss of carrier signal, to instruct the CDS to end the dictation session and to enable the base station to release the connection to the CDS according to a known protocol. Therefore, despite an abrupt loss of a base station's RF link with a WDD, the coupled CDS ends the dictation session and releases the dictation port for use by other base stations and WDDs, including the WDD that was cut off by the RF link.

The WDD downloads multiple disconnect strings for the number of CDSs having unique disconnect commands and with which the WDD is authorized to communicate. Of course, the EEPROM 51 must include storage space to accommodate the required number of disconnect strings.

At block 112, the software routine allows a doctor to setup a dictation session. First the doctor keys in, through the keypad 13, the dialing address of an authorized CDS or, if available, selects a speed dial key among keys 14a–j containing the dialing address of the CDS. When the link to a CDS is completed, the doctor commences to log onto the CDS by pressing certain keypad keys in response to prompts issued to the WDD from the CDS. The dictation session follows for as long as the doctor requires or an inactivity time out timer within the WDD expires.

The WDD software includes an inactivity time out limit as indicated by block 113. If the time out limit is exceeded, the WDD simultaneously blinks the "low battery" and "scan" LEDs for ten seconds. The WDD is powered "off" if data is not transmitted from the WDD during the ten seconds that the two LEDs are blinking.

Block 113 is the entry point to a program loop running through block 118 and looping back at block 113. Provided the inactivity timer, and the appended ten second LED blinking period are not expired, the software programs associated with blocks 113-118 are continuously repeated during the time a WDD is coupled to the CDS through a base station.

Block 114 represents a routine that enables MCU 31, which is coupled to the output of a carrier detector within the WDD's RF receiver 33 coupled over line 33a to MCU 31, to detect when the signal level at the carrier detector output is below a threshold level. The below threshold condition of the detector's output signal indicates that the WDD is out of the broadcast range of a base station's transmitter. The detection of the out of range condition, causes the MCU 31, in response to the software of block 114, to issue a series of audio warning beeps at speaker 11. The out of range condition is correctable when there is a steel pillar, or the like, in the vicinity of the WDD. The condition can often be cured by the doctor walking away from the steel pillar or other interfering object. Of course, the doctor may simply have walked out of range and knows to return toward the location of the base station.

The routines associated with blocks 115 and 116 are repeatedly encountered within the program loop comprising blocks 113–118. Routines 115 and 116, respectively, check for a key press among the keypad keys 13 and the programmable keys 14a–j and for data input from the bar code reader 17 produced by passing the reader over a bar code pattern. As explained above, FSK data packets are formed and transmitted from the WDD to a radio linked base station in response to the key presses and bar code scans.

Block 117 is a second battery check routine which watches for a low battery condition. It does so in the same manner as the software at block 104. However, the block 117 routine allows continued operation of the WDD for two minutes from the tine the low battery condition is detected. At the end of the two minutes, the power to the WDD is turned "off" The two minute period allows a doctor the opportunity to wrap up a dictation session, or a conventional two way voice conversation, with a called party. The MCU sends a signals to the WDD's LEDs to blink selected ones of the LEDs in a "low battery" warning pattern to alert the doctor of the low battery condition. The low battery is recharged or replaced to restore the WDD back to service.

The program associated with block 118 is the last routine in loop comprising the software associated with blocks 113–118. Routine 118 enables the MCU to detect that the power switch to the WDD is switched "off" and manages an orderly shutdown of the system software.

IV. The Base Station Software

As described above, the base station acts as a conduit for the direct passage of audio information in the form of analog voice signals originating at a WDD through a base station to a CDS and for the direct passage of analog synthetic voice signals originating at the CDS through the base station to the WDD. MCU 61 controls the passage of the analog signals through the base station but does not otherwise process the signals.

FSK signals generated at a WDD and received at a base station are demodulated and processed by MCU 61 in accordance with information associated with the packets. The digital data packets from a WDD comprise a header, packet type, length, data and check sum components. MCU 61 processes the packets and the data and, when appropriate, produces a DTMF generator to generate DTMF tone signals to address a CDS directly or through a PBX or TELCO switch and to transmits data and dictation commands to the CDS. The base station is also able to transmit the FSK data to a PC coupled to processor 61 over lines 84a and 92 at input and output ports 84a and 92a, respectively.

Figure 6:
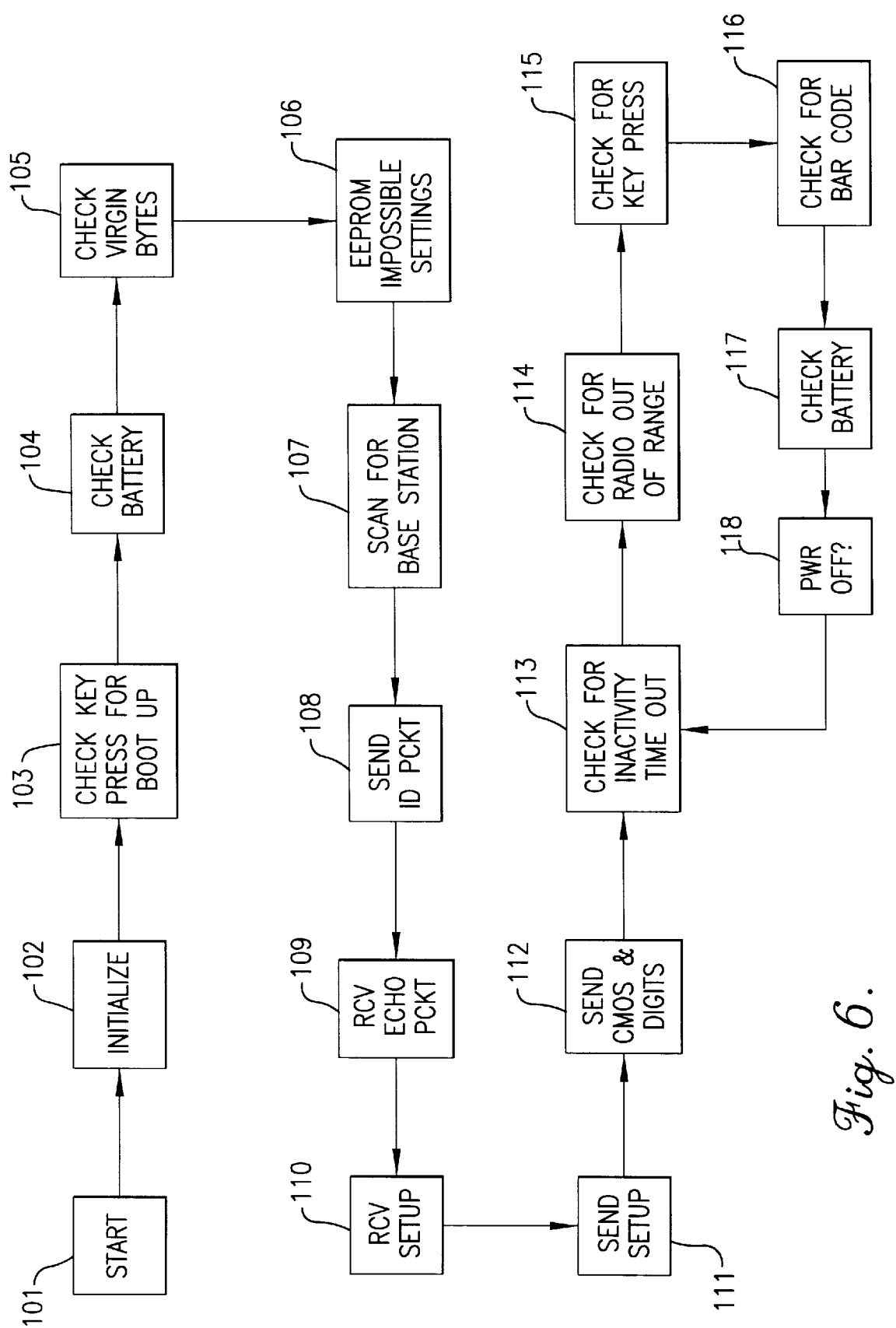
FIG. 6 is a flowchart representing functions which are under control of software running on the computer or processor of a WDD.

FIGS. 6a, 6b and 6c are flowcharts which represent functions performed by the base station software running on MCU 61, including those functions devoted to connecting a base station to a WDD.

FIG. 7a depicts a main flow chart for the base station system software. The starting or entry point to the software is represented by circle 121. The starting point is encountered when the power to the base station is turned "on". The system software routine represented by block 122 initializes the MCU input and output ports, sets variables and interrupts, respectively, to initial values and conditions, turns base station RF receiver 65 "on" and RF transmitter 66 "off". Further setup conditions for the base station are handled by a routine represented by block 123. This routine causes the MCU 61 to read parameters stored in EEPROM 68 for configuring the base station, for example, to communicate exclusively over its assigned channel with one or more WDDs, one at a time.

At decision block or element 124, the base station software waits in a loop for the base station's receiver to detect a carrier signal transmitted from a WDD authorized to communicate with the base station. Base station receiver 65 responds only to one channel, by design: the channel exclusively assigned to a base station. The specific number of base stations, and a corresponding number of full duplex RF channels, is chosen to serve the needs of an expected number of users located within a work environment or campus. The number of base stations suitable for a given work place is selected, for example, to be large enough to provide an intended group of users, each assigned a WDD, with an acceptable level of access to a particular number of CDSs. The frequency spacing between the unique channels assigned to each base station is customized to avoid intermodulation of RF signals transmitted by the base stations. The 0.75 milliwatt (mw) RF power of the WDDs and base stations is too low to create interference with medical diagnostic and life support equipment located within a health campus.

In one embodiment of the universal dictation input system, each WDD is preprogrammed, for example, with the same one hundred authorized channels, widely separated by frequency from one another, for use with up to one hundred base stations. In addition, each WDD is preprogrammed with the same command sets for the three different CDSs and may be programmed to include more command sets with the capacity of the current EEPROM being the limiting factor. This configuration simplifies the installation of the system, allows for expansion and minimizes the amount of individual programming of WDDs and base stations to suit the needs of a particular work group.

Certain users of the universal dictation input system require special consideration for obtaining access to a CDS or other members of the a given workplace. Two individuals within a hospital environment who are likely to need special access are the Chief of Staff and a radiologist. Each of these professionals may require both a higher level of privacy and one hundred percent availability of a base station for connection to a CDS or voice line to another member of the hospital staff. For these individuals, their WDDs are programmed with a personal carrier channel of one specific base station. No other WDD is permitted to be programmed with an assigned channel number. A radiologist typically conducts a large number of dictation sessions during the course of a working period and the Chief of Staff must have the availability of a base station at all times regardless of the Chief's frequency of usage.. Having exclusive access to a base station guarantees the Chief of Staff, the radiologist and other workers the access to a base station their positions require.

When authorized carrier is detected by a base station's receiver at decision block 124, the software moves to the routine at block 125 which turns "on" the base station transmitter by enabling the transmitter PLL synthesizer 62. At software decision routine 126, MCU 61 waits in a program loop for an ID packet from an authorized WDD. The receipt of the ID packet represents the connection of the WDD to the base station. Employing the routine at block 127, MCU 61 interprets the received ID packet, forms an ECHO ID packet and transmits the packet to the WDD. The WDD compares the transmitted and received ID numbers to verify that communications have been established with an authorized base station.

Following the transmission of the ECHO ID packet to the WDD, the software of block 127 causes the base station to upload, that is to transmit packets containing setup data to the WDD discussed above.

The routine at block 128 is a program loop for detecting setup data downloaded from a WDD to the base station and to detect the end of setup data packets. The setup data includes, by way of example, the list of commands shown in Table 1 to be used by the PVT in the base station in connection with the voice recognition feature explained above. The base station program stores the setup data by writing the just received command set data over that downloaded by this or another WDD previously connected to this base station. The dialing address of the CDS to which a WDD seeks to have the base station make a connection, is transmitted to the base station during the execution of the main loop of the base station software comprising software blocks 129–136.

The base station system main software loop of blocks 129–136 is executed while the current WDD remains in radio communication with the base station. The main loop processes data packets or messages received by the MCU 61 including: (1) radio packets transmitted from a WDD and received at MCU input port 79 (pin PD7); (2) external packets sent from a PC (or other external device) over a serial line coupled to serial input port 92 (RDI) of MCU 61; and (3) PVT packets received over a serial line extending from the PVT to the MCU serial input port 92 (RDI).

Block 129 is the routine within the MCU which checks for the presence of radio packets including: a keypad type packet, a programmable key type packet, a VR key type packet and a bar code reader type packet. The routine of block 129 ignores packets received from an external source such as PC 94 and from the base station's PVT 80. The radio packets are acted on by the routine of block 131. The actions taken are those basic, base station functions discussed above which connect a WDD to a called party or to a CDS to conduct a real time conversation or dictation session.

The routines of blocks 132 and 133, respectively, check for the presence of external packets and act on those packets and ignore all radio and PVT packets. The actions taken include those requested by base station connection software running on PC 94, for example, to configure the base station EEPROM 68 with base station data including the codes which tune the base station transmitter and receiver to the channel exclusively assigned to a base station. Other external packets recognized and acted on from an external source are diagnostic in nature, permitting various features of the base station to be tested.

The routines of blocks 134 and 135, respectively, check for the presence of PVT packets and act on those packets and ignore all radio and external packets. As discussed above in the section on the WDD, the action taken in connection with a VR key packet is to alert MCU 61 to route subsequently received analog voice signals directly to the PVT for conversion to ASCII character codes corresponding to CDS command. The voice signals are routed directly to port 95 of the PVT 80 and are converted into ASCII character codes by a voice recognition algorithm running on DSP 88. The resultant DSP generated ASCII codes represent the commands of the CDS to which the base station is connected. The spoken words or phrases which the PVT coverts to ASCII codes include the words for the keypad digits and symbols 0–9, * (star), # (pound), A, B, C and D. Spoken words translated into ASCII characters are packaged into a PVT packet by the DSP and are routed from PVT output port 89 to the serial input port 92 of the MCU. MCU 61, in turn, converts the ASCII characters in the received packets into DTMF tone signals which the CDS interpret as commands for controlling a dictation session.

Decision block 136 checks for the presence of a carrier signal from an authorized WDD and completes a loop back to block 129 provided carrier is detected. When the WDD disconnects from the base station, the routine of block 136 proceeds to the routine at block 137 to turn the base station's RF transmitter "off". From block 137, the system software is routed back to block 124 to put the base station in a wait loop looking for the next call of a WDD to this base station as represented by detection at the base station's receiver of a carrier signal from a WDD over the base station's unique channel. The base station receiver 65 (FIG. 5) includes a carrier loss detection circuit coupled to MCU 61 in the manner described for the WDD and illustrated by line 33a in FIG. 4.

Turning now to FIG. 7b, the flow chart shown is for the operation of base station MCU 61 when a VR packet is received from a WDD putting the MCU into a voice recognition operation in conjunction with PVT 80. The voice recognition feature of the input system 1 provides the doctor, or other user, the option to verbally issue a command to a CDS rather than issue a command by pressing one of the keys on keypad 13 or a key among the programmable keys 14a–j. In addition, when a CDS is in a data entry mode, the voice recognition feature offers the user the option of entering numerical data by verbally reciting a digit, that is, a number among the digits 0–9, rather than pressing the keys 0–9 on keypad 13.

Block 141 represents a software routine invoked when the MCU detects a start VR key packet at block 131 (FIG. 7a). At block 142, the software verifies the receipt by the base station of a start VR request. Decision block 143 represents the results of the verification at block 142 with the program returning to block 132 of FIG. 7a if the verification f, and proceeding to decision block 144 if the verification succeeds.

Block 144 routes the system program to block 146 if the doctor using the WDD presses the VR key and keeps it in the down position. This action gives rise to a VR packet containing an "on" or "start" VR character. Block 144 routes the program to block 145 when the base station receives a stop VR packet containing a "stop" or "off" VR character caused by the doctor releasing the pressed VR key. The software at block 145 disables the voice recognition feature. The start and stop VR characters enable and disable the voice recognition algorithm of DSP 88 in the PVT.

MCU 61 communicates with the PVT over the lead line 84a coupled between the MCU serial output port 84 and the PVT RS232 input port 85 (FIG. 5). The MCU informs the PVT of the request for voice recognition and forwards to the PVT the specific command list for a given CDS, for ad example the command list of Table 1. The MCU receives PVT packets back from the PVT over line 92a (FIG. 5). The PVT packets contain ASCII character codes corresponding to the spoken words for the keypad digits, comprising 0–9, *, # and A, B, C and D and spoken CDS commands such as "record" and "rewind".

The decision routine at block 147 distinguishes between those ASCII character codes representing digits 0–9 and those representing non-digits, including the dialing characters *, #, A, B, C and D, associated with the extended dialing keypad 13 (see FIGS. 2 and 4). As mentioned above, the separation of commands from digits is to distinguish between issuing spoken word commands to a CDS to control a dictation session versus issuing the spoken words for the 0–9 digits to enter data into a data field associated with a CDS dictation session.

The routine at block 147 routes digits for data entry to software blocks 151–155 which include routines for collecting digits into an intended grouping. Also, the user is given the opportunity to listen at the WDD speaker 11 (FIG. 2) to an audio playback of synthetic speech for the words representing the digits collected by the base station.

Block 151 along with block 152 comprise a program loop to collect the digits and to stop the collection process when the last digit in a string of recited digits is stored in a holding register associated with block 151. The last digit in a string of digits is identified by the routine at block 152 detecting the receipt of a "stop" VR packet issued by the user liking a finger off the VR key on the WDD.

The base station software represented at block 153 includes a text-to-speech ("TTS") algorithm that is invoked to translate each ASCII code for the digits 0–9 into synthetic speech signals. The speech signals produced by the TTS algorithm are transmitted by MCU 61 in a system packet to the WDD where MCU 31 reproduces speech signals from the received signals and sends them to speaker 11 where the sounds for the numbers are heard. The collected or stored digits are transmitted back to the user one at a time beginning with the most significant digit and ending with the least significant digit.

After all the collected digits are played back as speech, the doctor accepts or rejects the entered number by pressing the VR key 14j down and speaking into the WDD's microphone 12 (FIG. 2) either the word "good" or the word "bad" which are transmitted to the PVT. The software at block 148 recognizes the codes for the words "good" and "bad" translated by the PVT and these codes are read by the software at block 154. The software at block 154 routes the program back to the digit collection software of block 151 when the commands for the word "bad" is read by the routine at block 148. The software at block 155 is executed when the command for the word "good" is read by the routine at block 148.

Block 155 converts the approved, collection of digits 0–9 into a string of corresponding DTMF signals which the system software routes to the DTMF generator 82 (FIG. 5) for transmission of the DTMF tone signals representative of the number to the CDS.

ASCII character codes received from the PVT are routed by decision block 147 to block 148. Block 148 maps each received ASCII character code to a dialing digits (0–9, *, #, a, B, C and D) associated with keypad 13. The codes for the dialing digits are thereafter forwarded to the software associated with block 149 which develops the signals which are applied to the DTMF character generator 82 and, subsequently, by generator 82 to line interface chip 73, to produce the specific DTMF tone signals which represent dictation commands to the connected CDS. As discussed above, the command set for the current CDS is downloaded to the PVT shortly after communications between a WDD and a base station is established.

Referring to FIG. 7c, the blocks 161, 162 and 163 represent routines that check for three types of data packets received by the base station over the radio link from a WDD: keypad type, programmable key type, including the VR key, and bar code type. Block 164 includes software which checks the format of the packets and passes the result to a decision routine represented by block 165. Block 165 returns the program to the start circle 121 in FIG. 7a if the packet is not valid and routes the program to block 166 if the received packet is valid.

Block 166 is a decision routine for routing WDD data within the a station and in particular routing WDD to an external device coupled to MCU 61 input/outports 92 and 84 (FIG. 5), such as, PC 94 or other computer or computer controlled device, for storage and/or processing of WDD generated data externally to the universal dictation input system and for other purposes mentioned above. The external access to WDD data is provided for system administrative, data base entry, diagnostic and other technical and business purposes. The system administrator of the universal input dictation system programs the base station to establish routing of WDD data to suit various applications.

Software of block 167 coverts the ASCII codes contained in keypad packets received from a WDD into the $D_0$–$D_3$ signals (FIG. 5) for driving the DTMF tone signal generator 82 and routes them to the generator to produce the dialing digits associated with twelve-key and sixteen-key keypads. The connected CDS interprets the DTMF tone signals as dictation commands, while the CDS is in a dictation session. Likewise, the block 167 software converts the ASCII codes representing the decimal digits 0–9 contained in barcode packets received from a WDD into the signals $D_0$–$D_1$ for driving the DTMF generator and routes them to the generator to produce the DTMF tone signals representing the 0–9 digits. The connected CDS interprets the DTMF tone signals for the 0–9 digits as data for entry into a data field, during a data entry session.

The software of block 168 processes and routes within the base station the WDD data generated at programmable keys 14a–j and transmitted from a WDD in programmable key packets. This data contained in the packets includes a combination of ASCII codes representing dialing digits and commands, including CDS commands intended for execution by a CDS and system commands intended for execution by a base station. The CDS commands comprise a single dialing digit or, a combination of two or more dialing digits which the block 168 software routes to the DTMF generator to produce DTMF tone signals for transmission to the CDS. Examples of system commands processed by the base station include the PBX/TELCO commands or signals "on-hook", "off-hook", "wait" and "hook flash." The software of block 168 converts the ASCII codes for the foregoing PBX/TELCO into signals applied from MCU 61 to line interface chip 73.

The software of block 169 routes all ASCII code generated at the WDD and received at the base station to the serial output port of the MCU to make the data available to external devices, including devices such as PC 94.

What is claimed is:

1. A wireless dictation device (WDD) for conducting dictation sessions with a centralized dictation system (CDS) through a base station including a radio frequency (RF) transmitter and a RF receiver, over a single, exclusive RF radio channel pair associated with a base station, the WDD comprising in combination a programmed processor, a RF transmitter and a RF receiver, coupled to the processor, for transmitting information to and receiving information from a CDS through a base station, a dialing address keypad coupled to the processor for generating CDS address dialing code for transmission to a base station to couple a CDS at the transmitted dialing address to the WDD through a base station and for generating CDS commands for controlling a dictation session conducted with a CDS, a microphone coupled to the transmitter for capturing dictated speech as electrical signals for transmission to a CDS through a base station, a speaker coupled to the receiver for creating speech from electrical signals representative of speech transmitted to the WDD from a CDS through a base station, a RF scanner coupled to the programmed processor, the transmitter and the receiver for establishing communication with an available base station over the exclusive channel of a base station and non-volatile memory coupled to the processor for storing codes representing authorized channel pairs of authorized base stations with which the WDD is authorized to communicate and a character code for each key among the keys of the dialing keypad, said processor transmitting the character codes associated with keypad keys to a base station in keypad data packets including a character code representing each key among the keypad.

2. A wireless dictation device (WDD) for conducting dictation sessions with a centralized dictation system (CDS) through one of a plurality of base stations each including a radio frequency (RF) transmitter and a RF receiver, each of the base stations having a single, exclusive RF radio channel pair assigned to it, the WDD comprising in combination a programmed processor, a RF transmitter and a RF receiver, coupled to the processor, for transmitting information to and receiving information from the CDS through one of the base stations, a dialing address keypad coupled to the processor for generating CDS address dialing code for transmission to one of the base stations to couple the CDS at the transmitted dialing address to the WDD through one of the base stations and for generating CDS commands for controlling a dictation session conducted with the CDS, a microphone coupled to the transmitter for capturing dictation speech as electrical signals for transmission to the CDS through one of the base stations, a speaker coupled to the receiver for creating speech for electrical signals representative of speech transmitted to the WDD from the CDS through one of the base stations, a RF scanner coupled to the programmed processor, the transmitter and the receiver for establishing communication with one of the base stations over the exclusive channel of the base station and non-volatile memory coupled to the processor for storing codes representing authorized channel pairs of the base stations with which the WDD is authorized to communicate and a character code for each key among the keys of the dialing keypad, said processor transmitting the character codes associated with keypad keys to one of the base stations in keypad data packets including a character code representing each key among the keypad.

3. A wireless dictation device (WDD) for conducting dictation sessions with a centralized dictation system (CDS) through a base station, including a voice recognition (VR)

program running on a digital signal processor (DSP), a radio frequency (RF) transmitter and a RF receiver, over a single, exclusive RF radio channel associated with a base station, the device comprising in combination a programmed processor, a RF transmitter and a RF receiver, coupled to the processor, for transmitting information to and receiving information from a CDS through a base station, a dialing address keypad coupled to the processor for generating CDS dialing signal information for transmission to a base station for coupling the WDD to a CDS at the transmitted dialing address, a microphone coupled to the transmitter for capturing dictated speech as electrical signals representative of dictated speech information for transmission to a CDS through a base station and an audio speaker coupled to the receiver for creating audio speech from electrical signals representative of speech information transmitted from a CDS through a base station, memory coupled to the processor for storing at least one exclusive RF channel of one base station, a RF scanner coupled to the programmed processor, the transmitter and the receiver for establishing communication with an available base station over the exclusive channel of a base station and a programmable voice recognition (VR) key coupled to the processor for generating a VR signal transmitted to a base station to alert a base station that speech signals generated at the microphone subsequent to actuation of the VR key are to be translated into DTMF digits corresponding to dictation commands recognizable by a CDS.

4. Universal dictation input apparatus adapted for communicating with a centralized dictation system (CDS) of the type having at least one input port addressable by DTMF digits and responsive to DTMF digits for controlling a dictation session at a CDS, said universal dictation input apparatus comprising in combination a base station including a radio frequency (RF) transceiver, a RF receiver and an output port adapted for coupling directly or through a switch to a input port of a centralized dictation system (CDS) and a processor programmed to transmit and receive data including DTMF digit code data over a full duplex channel exclusively assigned to the base station, a plurality of wireless dictation devices (WDD) including a RF transmitter and RF receiver and a programmed processor for cyclically tuning said RF receiver of each WDD to the exclusive channel of said base station to determine if said base station is communicating with another WDD over the exclusive channel and, when said base station is not communicating with another WDD, tuning the WDD RF transmitter to the exclusive channel of the base station to transmit dialing digit codes to said base station to couple the base station to a CDS and to transmit dialing digit codes to the base station recognized by a dialed CDS as dictation commands for conducting a dictation session with a CDS while coupled to the base station.

5. Universal dictation input apparatus adapted for communicating with a centralized dictation system (CDS) of the type having at least one input port addressable by DTMF digits and responsive to DTMF digits for controlling a dictation session at the CDS, said universal dictation input apparatus comprising in combination a base station including a radio frequency (RF) transceiver, a RF receiver and an output port adapted for coupling directly or through a switch to an input port of the CDS and a processor programmed to transmit and receive data including DTMF digit code data over a single full duplex channel exclusively assigned to the base station, a plurality of wireless dictation devices (WDD) each including a RF transmitter and RF receiver and a programmed processor for cyclically tuning said RF receiver of each WDD to the exclusive channel of said base station to determine if said base station is communicating with another WDD over the exclusive channel and, when said base station is not communicating with another WDD, tuning the WDD RF transmitter to the exclusive channel of the base station to transmit dialing digit codes to said base station to couple the base station to a CDS and to transmit dialing digit codes to the base station recognized by a dialed CDS as dictation commands for conducting a dictation session with a CDS while coupled to the base station.

6. The universal dictation input system of claim 5 wherein said WDD includes a programmable key for transmitting to the programmed processor of the base station a start voice recognition signal for enabling the base station to route subsequently received spoken CDS commands to the digital signal processor for translation of the spoken commands into DTMF digit codes.

7. A base station including a radio frequency (RF) transmitter and a RF receiver for communicating over an assigned, exclusive full duplex RF channel, one at a time, with multiple wireless dictation devices (WDDs), each including a RF transmitter and a RF receiver for coupling a WDD to a centralized dictation system (CDS) through the base station to enable a WDD to initiate and conduct a dictation session with a CDS while coupled to the base station by transmitting DTMF codes to the base station which a CDS recognizes as dictation commands, said base station comprising in combination a base station programmed processor coupled to the RF transmitter and receiver, memory for storing the codes for tuning said RF transmitter and RF receiver to the assigned channel for transmission and reception and base station data representing information about the base station, said RF transmitter and RF receiver each including transmitter and receiver scanners for tuning, respectively, the transmitter and receiver to the assigned channel transmission and reception frequencies under the control of the programmed processor, said programmed processor
        tuning said receiver to the assigned channel for enabling a WDD to determine that the base station is available for communication with a WDD,
        tuning said transmitter to the assigned channel following receipt of a message from a WDD,
        transmitting to a WDD in response to a received message a return message verifying the establishment of communication therewith and for uploading to said WDD said stored base station data.

8. A base station including a radio frequency (RF) transmitter and a RF receiver for communicating over a single assigned, exclusive full duplex RF channel, one at a time, with multiple wireless dictation devices (WDDs), each WDD including a RF transmitter and a RF receiver for coupling to a centralized dictation system (CDS) through the base station to enable one of the WDDs to initiate and conduct a dictation session with the CDS while coupled to the base station by transmitting DTMF codes to the base station which the CDS recognizes as dictation commands, said base station comprising in combination a base station programmed processor coupled to the RF transmitter and receiver, memory for storing the codes for tuning said RF transmitter and RF receiver to the assigned channel for transmission and reception and base station data representing information about the base station, said RF transmitter and RF receiver each including transmitter and receiver scanners for tuning, respectively, the transmitter and receiver to the assigned channel transmission and reception frequencies under the control of the programmed processor, said programmed processor tuning said receiver to the assigned channel for enabling a WDD to determine that the base station is available for communication with a WDD, tuning said transmitter to the assigned channel following receipt of a message from a WDD, transmitting to a WDD in response to a received message a return message verifying the establishment of communication therewith and for uploading to said WDD said stored base station data.

\* \* \* \* \*